United States Patent
Wolf

(10) Patent No.: US 8,966,278 B2
(45) Date of Patent: *Feb. 24, 2015

(54) SYSTEM AND METHOD ENABLING PARALLEL PROCESSING OF HASH FUNCTIONS USING AUTHENTICATION CHECKPOINT HASHES

(71) Applicant: IGT, Las Vegas, NV (US)

(72) Inventor: Bryan D. Wolf, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/140,282

(22) Filed: Dec. 24, 2013

(65) Prior Publication Data

US 2014/0108812 A1 Apr. 17, 2014

Related U.S. Application Data

(63) Continuation of application No. 13/431,696, filed on Mar. 27, 2012, now Pat. No. 8,627,097.

(51) Int. Cl.
*G06F 21/00* (2013.01)
*G06F 21/51* (2013.01)
*G06F 21/64* (2013.01)

(52) U.S. Cl.
CPC ............... *G06F 21/51* (2013.01); *G06F 21/64* (2013.01)
USPC .......................................... 713/187; 707/698

(58) Field of Classification Search
CPC ......... G06F 21/44; H04L 9/32; H04L 9/3223; H04L 9/3236; H04L 9/3244; H04L 2209/38
See application file for complete search history.

(56) References Cited

U.S. PATENT DOCUMENTS 4,193,131 A 3/1980 Lennon et al.
4,200,770 A 4/1980 Diffie et al.
(Continued)

FOREIGN PATENT DOCUMENTS

EP 1 352 677 10/2003
EP 1 441 464 7/2004
(Continued)

OTHER PUBLICATIONS

Extended European Search Report for EP Appl. 13160789.7 dated Jun. 24, 2013 (9 pages).
(Continued)

*Primary Examiner* — Izunna Okeke
(74) *Attorney, Agent, or Firm* — Neal, Gerber & Eisenberg LLP

(57) ABSTRACT

Systems and methods enabling parallel processing of hash functions are provided. A data string including a plurality of pieces arranged in an order is hashed using a hash function to determine a plurality of authentication checkpoint hashes associated with the pieces. To authenticate the data string, the pieces are grouped into sets, and the authentication checkpoint hash associated with the piece following all other pieces of that set in the order is associated with that set. The system simultaneously performs a separate hash process on each set. That is, the system hashes the pieces of that set using the hash function to determine a result hash, and compares that result hash with the authentication checkpoint hash associated with that set. The initial input to the hash function for the hash process for each set includes one of the pieces and either a default seed or an authentication checkpoint hash.

20 Claims, 9 Drawing Sheets

(56) References Cited

U.S. PATENT DOCUMENTS

| | | |
|---|---|---|
| 4,218,582 A | 8/1980 | Hellman et al. |
| 4,355,390 A | 10/1982 | Hellwig et al. |
| 4,405,829 A | 9/1983 | Rivest et al. |
| 4,458,315 A | 7/1984 | Uchenick et al. |
| 4,462,076 A | 7/1984 | Smith et al. |
| 4,467,424 A | 8/1984 | Hedges et al. |
| 4,494,114 A | 1/1985 | Kaish |
| 4,519,077 A | 5/1985 | Amin |
| 4,525,599 A | 6/1985 | Curran et al. |
| 4,607,844 A | 8/1986 | Fullerton |
| 4,658,093 A | 4/1987 | Hellman et al. |
| 4,727,544 A | 2/1988 | Brunner et al. |
| 4,759,064 A | 7/1988 | Chaum |
| 4,817,140 A | 3/1989 | Chandra et al. |
| 4,845,715 A | 7/1989 | Francisco et al. |
| 4,865,321 A | 9/1989 | Nakagawa et al. |
| 4,930,073 A | 5/1990 | Cina et al. |
| 4,944,008 A | 7/1990 | Piosenka et al. |
| 5,004,232 A | 4/1991 | Wong et al. |
| 5,050,212 A | 9/1991 | Dyson et al. |
| 5,103,081 A | 4/1992 | Fisher et al. |
| 5,146,575 A | 9/1992 | Nolan et al. |
| 5,155,768 A | 10/1992 | Matsuhara et al. |
| 5,161,193 A | 11/1992 | Lampson et al. |
| 5,179,517 A | 1/1993 | Sarbin et al. |
| 5,224,160 A | 6/1993 | Paulini et al. |
| 5,231,668 A | 7/1993 | Kravitz |
| 5,235,642 A | 8/1993 | Wobber et al. |
| 5,238,250 A | 8/1993 | Leung et al. |
| 5,261,069 A | 11/1993 | Wilkinson et al. |
| 5,283,734 A | 2/1994 | Von Kohorn et al. |
| 5,288,978 A | 2/1994 | Iijima et al. |
| 5,291,585 A | 3/1994 | Sato et al. |
| 5,297,205 A | 3/1994 | Audebert et al. |
| 5,326,104 A | 7/1994 | Pease et al. |
| 5,343,527 A | 8/1994 | Moore et al. |
| 5,398,932 A | 3/1995 | Eberhardt et al. |
| 5,404,505 A | 4/1995 | Levinson |
| 5,421,006 A | 5/1995 | Jablon et al. |
| 5,426,763 A | 6/1995 | Okada et al. |
| 5,465,364 A | 11/1995 | Lathrop et al. |
| 5,488,702 A | 1/1996 | Byers et al. |
| 5,489,095 A | 2/1996 | Goudard et al. |
| 5,528,513 A | 6/1996 | Vaitzblit et al. |
| 5,577,209 A | 11/1996 | Boyle et al. |
| 5,586,937 A | 12/1996 | Menashe |
| 5,590,199 A | 12/1996 | Krajewski et al. |
| 5,599,231 A | 2/1997 | Hibino et al. |
| 5,604,801 A | 2/1997 | Dolan et al. |
| 5,610,839 A | 3/1997 | Karolak et al. |
| 5,643,086 A | 7/1997 | Alcorn et al. |
| 5,644,704 A | 7/1997 | Pease et al. |
| 5,668,945 A | 9/1997 | Ohba et al. |
| 5,692,178 A | 11/1997 | Shaughnessy et al. |
| 5,715,398 A | 2/1998 | Lubenow et al. |
| 5,715,403 A | 2/1998 | Stefik et al. |
| 5,737,418 A | 4/1998 | Saffari et al. |
| 5,742,616 A | 4/1998 | Torreiter et al. |
| 5,765,152 A | 6/1998 | Erickson et al. |
| 5,768,382 A | 6/1998 | Schneier et al. |
| 5,781,901 A | 7/1998 | Kuzma et al. |
| 5,799,086 A | 8/1998 | Sudia et al. |
| 5,805,712 A | 9/1998 | Davis et al. |
| 5,815,662 A | 9/1998 | Ong et al. |
| 5,892,900 A | 4/1999 | Ginter et al. |
| 5,892,904 A | 4/1999 | Atkinson et al. |
| 5,903,723 A | 5/1999 | Beck et al. |
| 5,905,860 A | 5/1999 | Olsen et al. |
| 5,909,491 A | 6/1999 | Luo |
| 5,913,039 A | 6/1999 | Nakamura et al. |
| 5,933,498 A | 8/1999 | Schneck et al. |
| 5,991,399 A | 11/1999 | Graunke et al. |
| 6,014,558 A | 1/2000 | Thomas et al. |
| 6,016,348 A | 1/2000 | Blatter et al. |
| 6,029,046 A | 2/2000 | Khan et al. |
| 6,032,200 A | 2/2000 | Lin |
| 6,038,601 A | 3/2000 | Lambert et al. |
| 6,044,157 A | 3/2000 | Uesaka et al. |
| 6,049,821 A | 4/2000 | Theriault et al. |
| 6,052,720 A | 4/2000 | Traversat et al. |
| 6,071,190 A | 6/2000 | Weiss et al. |
| 6,085,193 A | 7/2000 | Malkin et al. |
| 6,099,408 A | 8/2000 | Schneier et al. |
| 6,104,815 A | 8/2000 | Alcorn et al. |
| 6,106,396 A | 8/2000 | Alcorn et al. |
| 6,141,756 A | 10/2000 | Bright et al. |
| 6,149,522 A | 11/2000 | Alcorn et al. |
| 6,157,721 A | 12/2000 | Shear et al. |
| 6,185,625 B1 | 2/2001 | Tso et al. |
| 6,190,257 B1 | 2/2001 | Takeda et al. |
| 6,195,433 B1 | 2/2001 | Vanstone et al. |
| 6,195,587 B1 | 2/2001 | Hruska et al. |
| 6,203,427 B1 | 3/2001 | Walker et al. |
| 6,205,475 B1 | 3/2001 | Pitts |
| 6,212,657 B1 | 4/2001 | Wang et al. |
| 6,243,719 B1 | 6/2001 | Ikuta et al. |
| 6,256,637 B1 | 7/2001 | Venkatesh et al. |
| 6,264,557 B1 | 7/2001 | Schneier et al. |
| 6,278,782 B1 | 8/2001 | Ober et al. |
| 6,289,452 B1 | 9/2001 | Arnold et al. |
| 6,292,899 B1 | 9/2001 | McBride |
| 6,310,956 B1 | 10/2001 | Morito et al. |
| 6,330,566 B1 | 12/2001 | Durham |
| 6,338,050 B1 | 1/2002 | Conklin et al. |
| 6,353,888 B1 | 3/2002 | Kakehi |
| 6,389,460 B1 | 5/2002 | Stewart et al. |
| 6,389,538 B1 | 5/2002 | Gruse et al. |
| 6,412,008 B1 | 6/2002 | Fields et al. |
| 6,412,011 B1 | 6/2002 | Agraharam et al. |
| 6,427,238 B1 | 7/2002 | Goodman et al. |
| 6,442,691 B1 | 8/2002 | Blandford |
| 6,446,113 B1 | 9/2002 | Ozzie et al. |
| 6,450,885 B2 | 9/2002 | Schneier et al. |
| 6,466,048 B1 | 10/2002 | Goodman |
| 6,480,883 B1 | 11/2002 | Tsutsumitake |
| 6,500,070 B1 | 12/2002 | Tomizawa et al. |
| 6,510,502 B1 | 1/2003 | Shimizu |
| 6,526,581 B1 | 2/2003 | Edson |
| 6,527,638 B1 | 3/2003 | Walker et al. |
| 6,557,104 B2 | 4/2003 | Vu et al. |
| 6,565,443 B1 | 5/2003 | Johnson et al. |
| 6,571,279 B1 | 5/2003 | Herz et al. |
| 6,574,605 B1 | 6/2003 | Sanders et al. |
| 6,594,682 B2 | 7/2003 | Peterson et al. |
| 6,595,856 B1 | 7/2003 | Ginsburg et al. |
| 6,606,644 B1 | 8/2003 | Ford et al. |
| 6,620,047 B1 | 9/2003 | Alcorn et al. |
| 6,654,388 B1 | 11/2003 | Lexenberg et al. |
| 6,675,350 B1 | 1/2004 | Abrams et al. |
| 6,685,567 B2 | 2/2004 | Cockerille et al. |
| 6,694,434 B1 | 2/2004 | McGee et al. |
| 6,697,948 B1 | 2/2004 | Rabin et al. |
| 6,704,797 B1 | 3/2004 | Fields et al. |
| 6,722,986 B1 | 4/2004 | Lyons et al. |
| 6,751,729 B1 | 6/2004 | Giniger et al. |
| 6,760,324 B1 | 7/2004 | Scott et al. |
| 6,785,712 B1 | 8/2004 | Hogan et al. |
| 6,805,629 B1 | 10/2004 | Weiss |
| 6,811,486 B1 | 11/2004 | Luciano, Jr. |
| 6,826,593 B1 | 11/2004 | Acharya et al. |
| 6,832,241 B2 | 12/2004 | Tracton et al. |
| 6,851,607 B2 | 2/2005 | Orus |
| 6,859,535 B1 | 2/2005 | Tatebayashi et al. |
| 6,873,975 B1 | 3/2005 | Hatakeyama et al. |
| 6,889,209 B1 | 5/2005 | Rabin et al. |
| 6,901,386 B1 | 5/2005 | Dedrick et al. |
| 6,920,567 B1 | 7/2005 | Doherty et al. |
| 6,928,551 B1 | 8/2005 | Lee et al. |
| 6,938,021 B2 | 8/2005 | Shear et al. |
| 6,948,070 B1 | 9/2005 | Ginter et al. |
| 6,993,557 B1 | 1/2006 | Yen |
| 7,024,394 B1 | 4/2006 | Ashour et al. |
| 7,039,708 B1 | 5/2006 | Knobl et al. |
| 7,051,212 B2 | 5/2006 | Ginter et al. |

(56) References Cited

U.S. PATENT DOCUMENTS

| | | |
|---|---|---|
| 7,062,500 B1 | 6/2006 | Hall et al. |
| 7,063,615 B2 | 6/2006 | Alcorn et al. |
| 7,069,451 B1 | 6/2006 | Ginter et al. |
| 7,080,257 B1 | 7/2006 | Jakubowski et al. |
| 7,092,953 B1 | 8/2006 | Haynes |
| 7,099,479 B1 | 8/2006 | Ishibashi et al. |
| 7,108,605 B2 | 9/2006 | LeMay et al. |
| 7,120,802 B2 | 10/2006 | Shear et al. |
| 7,124,304 B2 | 10/2006 | Bel et al. |
| 7,158,637 B2 | 1/2007 | Ohta et al. |
| 7,179,170 B2 | 2/2007 | Martinek et al. |
| 7,201,662 B2 | 4/2007 | LeMay et al. |
| 7,225,333 B2 | 5/2007 | Peinado et al. |
| 7,228,426 B2 | 6/2007 | Sinha et al. |
| 7,322,042 B2 | 1/2008 | Srinivasan et al. |
| 7,330,717 B2 | 2/2008 | Gidron et al. |
| 7,380,275 B2 | 5/2008 | Srinivasan et al. |
| 7,401,352 B2 | 7/2008 | Duri et al. |
| 7,415,620 B2 | 8/2008 | England et al. |
| 7,424,611 B2 | 9/2008 | Hino et al. |
| 7,491,122 B2 | 2/2009 | Ryan |
| 7,600,108 B2 | 10/2009 | Gentles |
| 7,636,843 B1 | 12/2009 | Asano et al. |
| 7,644,429 B2 | 1/2010 | Bayassi et al. |
| 7,681,033 B2 | 3/2010 | Miura et al. |
| 7,827,397 B2 | 11/2010 | McCoull et al. |
| 7,828,653 B2 | 11/2010 | Gazdic et al. |
| 7,991,999 B2 | 8/2011 | Princen et al. |
| 7,993,202 B2 | 8/2011 | Rowe et al. |
| 8,055,970 B1 | 11/2011 | Smith et al. |
| 8,140,824 B2 | 3/2012 | Craft |
| 8,226,473 B2 | 7/2012 | Gazdic et al. |
| 2001/0014882 A1 | 8/2001 | Stefik et al. |
| 2001/0026287 A1 | 10/2001 | Watanabe |
| 2002/0016818 A1 | 2/2002 | Kirani et al. |
| 2002/0032784 A1 | 3/2002 | Darago et al. |
| 2002/0049909 A1 | 4/2002 | Jackson et al. |
| 2002/0057799 A1 | 5/2002 | Kohno |
| 2002/0059384 A1 | 5/2002 | Kaars |
| 2002/0071557 A1 | 6/2002 | Nguyen |
| 2002/0085720 A1 | 7/2002 | Okada et al. |
| 2002/0116615 A1 | 8/2002 | Nguyen et al. |
| 2002/0137566 A1 | 9/2002 | Tomizawa |
| 2002/0138764 A1 | 9/2002 | Jacobs et al. |
| 2002/0154799 A1 | 10/2002 | Anderson et al. |
| 2002/0160833 A1 | 10/2002 | Lloyd et al. |
| 2002/0161673 A1 | 10/2002 | Lee et al. |
| 2002/0162115 A1 | 10/2002 | Bruckner et al. |
| 2002/0165022 A1 | 11/2002 | Hiraoka |
| 2002/0165028 A1 | 11/2002 | Miyamoto et al. |
| 2002/0169974 A1 | 11/2002 | McKune |
| 2002/0184160 A1 | 12/2002 | Tadayon et al. |
| 2003/0009423 A1 | 1/2003 | Wang et al. |
| 2003/0023427 A1 | 1/2003 | Cassin et al. |
| 2003/0023564 A1 | 1/2003 | Padhye et al. |
| 2003/0028622 A1 | 2/2003 | Inoue et al. |
| 2003/0045355 A1 | 3/2003 | Comair |
| 2003/0114227 A1 | 6/2003 | Rubin |
| 2003/0120541 A1 | 6/2003 | Siann et al. |
| 2003/0130032 A1 | 7/2003 | Martinek et al. |
| 2003/0144869 A1 | 7/2003 | Fung et al. |
| 2003/0157985 A1 | 8/2003 | Shteyn |
| 2003/0166398 A1 | 9/2003 | Netanel |
| 2003/0182142 A1 | 9/2003 | Valenzuela et al. |
| 2003/0195033 A1 | 10/2003 | Gazdic et al. |
| 2003/0196108 A1 | 10/2003 | Kung |
| 2003/0220142 A1 | 11/2003 | Siegel |
| 2003/0221114 A1 | 11/2003 | Hino et al. |
| 2004/0002381 A1 | 1/2004 | Alcorn et al. |
| 2004/0015426 A1 | 1/2004 | Tadayon et al. |
| 2004/0038740 A1 | 2/2004 | Muir |
| 2004/0039929 A1 | 2/2004 | Decime |
| 2004/0044901 A1 | 3/2004 | Serkowski et al. |
| 2004/0054923 A1 | 3/2004 | Seago et al. |
| 2004/0054952 A1 | 3/2004 | Morrow et al. |
| 2004/0083388 A1 | 4/2004 | Nguyen |
| 2004/0098297 A1 | 5/2004 | Borthwick |
| 2004/0098580 A1 | 5/2004 | DeTreville |
| 2004/0098610 A1 | 5/2004 | Hrastar |
| 2004/0102987 A1 | 5/2004 | Takahashi et al. |
| 2004/0116119 A1 | 6/2004 | Lewis et al. |
| 2004/0248646 A1 | 12/2004 | Canterbury |
| 2004/0259643 A1 | 12/2004 | Gentles |
| 2005/0004875 A1 | 1/2005 | Kontio et al. |
| 2005/0009599 A1 | 1/2005 | Ryan |
| 2005/0038753 A1 | 2/2005 | Yen et al. |
| 2005/0071640 A1 | 3/2005 | Sprunk |
| 2005/0097618 A1 | 5/2005 | Arling et al. |
| 2005/0122977 A1 | 6/2005 | Lieberman |
| 2005/0143171 A1 | 6/2005 | Loose |
| 2005/0232284 A1 | 10/2005 | Karaoguz et al. |
| 2006/0026150 A1* | 2/2006 | Hamada ........................ 707/4 |
| 2006/0026691 A1 | 2/2006 | Kim et al. |
| 2006/0031222 A1 | 2/2006 | Hannsmann |
| 2006/0080529 A1 | 4/2006 | Yoon et al. |
| 2006/0090084 A1 | 4/2006 | Buer |
| 2006/0116208 A1 | 6/2006 | Chen et al. |
| 2006/0117175 A1 | 6/2006 | Miura et al. |
| 2006/0129848 A1 | 6/2006 | Paksoy et al. |
| 2006/0136570 A1 | 6/2006 | Pandya |
| 2006/0153368 A1 | 7/2006 | Beeson |
| 2006/0236122 A1 | 10/2006 | Field et al. |
| 2006/0253702 A1 | 11/2006 | Lowell et al. |
| 2007/0005504 A1 | 1/2007 | Chen et al. |
| 2007/0016832 A1 | 1/2007 | Weiss |
| 2007/0067826 A1 | 3/2007 | Conti |
| 2007/0149280 A1 | 6/2007 | LeMay et al. |
| 2007/0150730 A1 | 6/2007 | Conti |
| 2007/0232394 A1 | 10/2007 | Gazdic et al. |
| 2007/0249416 A1 | 10/2007 | Gazdic et al. |
| 2008/0028235 A1 | 1/2008 | Smith et al. |
| 2008/0096608 A1 | 4/2008 | Wendling |
| 2008/0275750 A1 | 11/2008 | Robinson et al. |
| 2009/0028090 A1 | 1/2009 | Sim et al. |
| 2009/0193211 A1* | 7/2009 | Hu et al. ...................... 711/163 |
| 2009/0280906 A1 | 11/2009 | Larsen et al. |
| 2010/0062844 A1 | 3/2010 | Crowder, Jr. et al. |
| 2010/0106976 A1 | 4/2010 | Aciicmez et al. |
| 2011/0078430 A1 | 3/2011 | McCoull et al. |
| 2011/0131404 A1 | 6/2011 | Lee et al. |
| 2012/0196674 A1 | 8/2012 | Gazdic et al. |
| 2013/0053137 A1 | 2/2013 | Nelson et al. |
| 2013/0059655 A1 | 3/2013 | Wasicek et al. |

FOREIGN PATENT DOCUMENTS

| | | |
|---|---|---|
| EP | 1 489 567 | 12/2004 |
| WO | WO 97/08870 | 3/1997 |
| WO | WO 99/65579 | 12/1999 |
| WO | WO 00/33196 | 6/2000 |
| WO | WO 01/24012 | 4/2001 |
| WO | WO 01/67218 | 9/2001 |
| WO | WO 02/15998 | 2/2002 |
| WO | WO 02/101537 | 12/2002 |
| WO | WO 03/045519 | 6/2013 |

OTHER PUBLICATIONS

Ferguson et al.; "The Skein Hash Function Family"; White Paper; Oct. 1, 2010; available at http://www.schneier.com/skein1.3.pdf (100 pages).

Silva; "An Overview of Cryptographic Hash Functions and Their Uses"; White Paper; Jan. 15, 2003; available at http://www.sans.org/reading_room/whitepapers/vpns/overview-cryptographic-hash-functions_879 (13 pages).

Wikipedia; "Cryptographic hash function"; printed Mar. 15, 2013; available at http://en.wikipedia.org/wiki/Cryptographic_hash_function (5 pages).

* cited by examiner

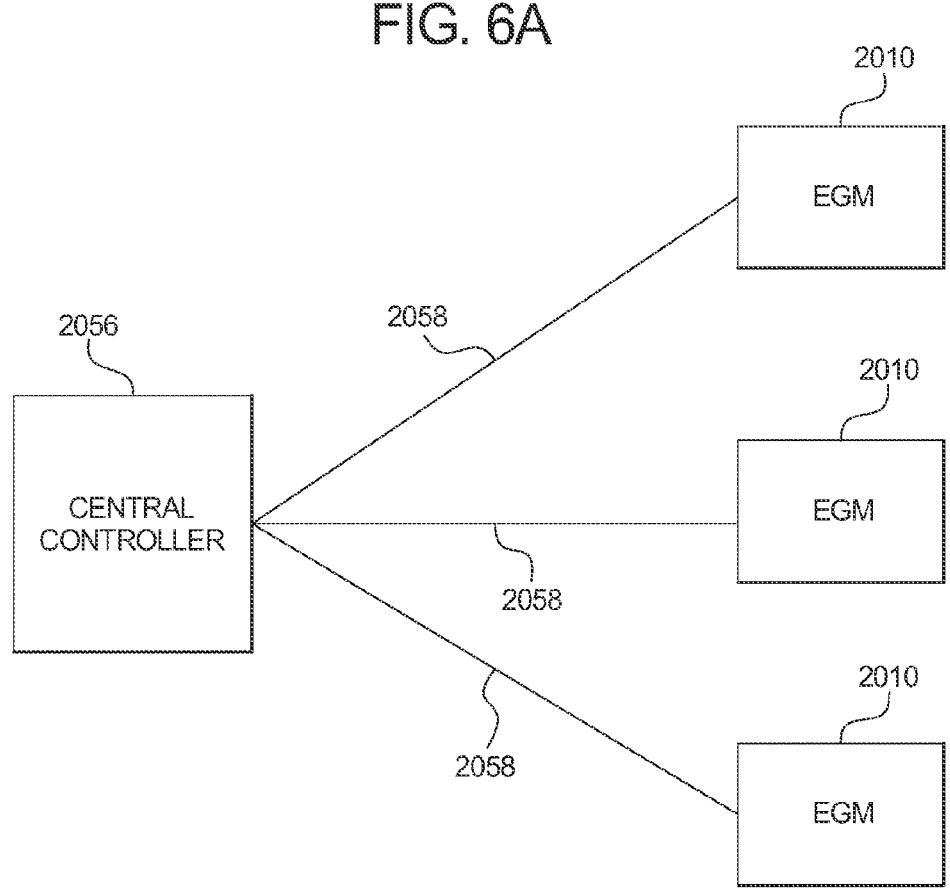

SYSTEM AND METHOD ENABLING PARALLEL PROCESSING OF HASH FUNCTIONS USING AUTHENTICATION CHECKPOINT HASHES

PRIORITY CLAIM

This application is a continuation of, and claims priority to and the benefit of, U.S. patent application Ser. No. 13/431, 696, filed on Mar. 27, 2012, the entire contents of which are incorporated herein by reference.

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

In today's digital age, an enormous amount of information, such as executable program code, documents, bank statements, insurance information, and the like, is stored as data on a variety of computing devices, such as servers, personal computers, tablet computing devices, and smart phones. The nature of such digitally-stored data renders it especially susceptible to unauthorized modification that is extremely difficult to detect with the naked eye. For example, an individual could change a few words in a few lines of a one hundred page contract to render that contract more favorable to that individual. In another example, an individual could insert a few lines of code into a program code including tens or hundreds of thousands or millions of fines of code. When that program code is executed, the additional fines of code cause one or more functions of the executed program to operate differently than intended. In one instance in which the program code is stored on and executable by an electronic gaming machine (EGM) to operate a wagering game, such as a video slot game, such unauthorized modifications could provide the individual with an advantage in the video slot game that no other player would receive. Such examples outline the necessity to authenticate certain data strings, such as confidential documents and program code, stored on a computing device to ensure that such data strings have not been modified in an unauthorized manner. For instance, prior to executing a program code stored on an EGM, the EGM authenticates the stored program code to determine whether it has been modified in an unauthorized manner.

While there are many ways to authenticate a data string, the use of a one-way hash function (referred to herein as a "hash function") to determine whether a copy of a data string has been modified relative to the original data string (i.e., to authenticate the copy of the data string) is commonplace. Generally, a hash function is a function (such as a mathematical function) that converts a variable-length input string into a different, static-length output string commonly referred to as a result hash. Put differently, the input string is hashed using the hash function (i.e., input into the hash function) to obtain the result hash. Both the input string and the output string typically include letters, numbers, and/or other characters. For a given input string and a given hash function, when that input string is hashed using that hash function, the same result hash is always obtained. A hash function is referred to as a "one-way" hash function because it is relatively easy to use the hash function to obtain a result hash for a given input string (i.e., by hashing the input string using the hash function), but it is extremely difficult and, in certain instances, computationally infeasible, to obtain an input string for a given result hash. In other words, given an input string, it is easy to use the hash function to obtain the corresponding output string, but given an output string, it is nearly impossible to use the hash function to obtain the corresponding input string. Certain hash functions are collision resistant. For such a hash function, it is extremely difficult and, in certain instances, computationally infeasible, to determine two different input strings that, when hashed using the hash function (i.e., when input into the hash function), result in a same result hash. Thus, in such collision-resistant hash functions, each input string is associated with a unique corresponding result hash.

Since the same result hash is always obtained when a given input string is hashed using a given hash function, hash functions can be used to authenticate a copy of a data string by determining whether a result hash obtained from hashing the original data string is the same as a result hash obtained from hashing the copy of the data string. More specifically, a hash function is typically used to authenticate a copy of a data string in the following manner: (a) the original data string is hashed (such as at a first point in time) using a hash function to obtain a first result hash, (b) the copy of the data string is hashed (such as at a second subsequent point in time) using the same hash function to obtain a second result hash, and (c) the first result hash and the second result hash are compared to determine whether the first result hash and the second result hash are the same. If the first result hash and the second result hash are the same, the original data string and the copy of the data string are the same, and the copy of the data string is, therefore, authentic (i.e., has not been modified relative to the original data string). If the first result hash and the second result hash are different, the data string and the copy of the data string are not the same, and the copy of the data string is, therefore, not authentic (i.e., has been modified relative to the original data string).

In one example, Joe creates a document that Joe intends to email to Eileen. Before emailing a copy of the document to Eileen, Joe instructs his computer to hash the document (which is the input string in this example) using a hash function to obtain a first result hash. Joe emails a copy of the document and the first result hash to Eileen. After receiving the copy of the document and the first result hash, Eileen instructs her computer to hash the copy of the document using the same hash function to obtain a second result hash. Eileen compares the first result hash with the second result hash. If the two result hashes are the same, Eileen knows that the copy of the document is the same as the document Joe created. If the two result hashes are different, Eileen knows that the copy of the document is not the same as the document Joe created.

In another example, Dan creates a document and saves the document on the hard drive of his computer. Dan is going on vacation, and wants to be sure that the document is not altered by his roommate Joey while he is away. Dan instructs his computer to hash the document (which is the input string in this example) using a hash function to obtain a first result hash, and stores the first result hash in a secure location. After returning from vacation, Dan again instructs his computer to hash the document using the same hash function to obtain a second result hash. Dan compares the first result hash with the second result hash. If the two result hashes are the same, Dan knows that the document was not altered since he first hashed the document. If the two result hashes are different, Dan knows that the document was altered since he first hashed the document.

In most instances, a data string is too large to be hashed at once. In such instances, the data string is typically divided into a plurality of data string pieces arranged in a designated order, and those data string pieces are sequentially hashed in the designated order. In these instances, a first data string piece in the designated order and a default seed are hashed using a hash function (i.e., are input into the hash function) to obtain a first result hash. For each subsequent data string piece in the designated order: (a) that data string piece, and (b) the result hash obtained from hashing the data string piece immediately preceding that data string piece in the designated order are hashed using the hash function (i.e., are input into the hash function) to obtain a result hash. Thus, it should be appreciated that in these instances the Nth data string piece cannot be hashed until the N−1th data string piece has been hashed because the result hash obtained from hashing the N−1th data string piece is used as one of the inputs to the hash function when the Nth data string piece is hashed. When each data string piece has been hashed, the final result hash represents the result of the entire data string being hashed.

The quantity of data string pieces into which the data string is divided is typically determined based on the hash function used to hash the data string. That is, certain hash functions only operate on data string pieces of a specific size. For example, an MD5 hash hashes 128 bit data string pieces. Thus, in this example, the data string is divided into a plurality of 128 bit data string pieces, and then those pieces are hashed using the MD5 hash in the manner described above. Specifically, in this example, the quantity of data string pieces is equal to the size of the data string, in bytes, divided by sixteen and rounded up.

FIG. 1 is a block diagram illustrating an example hash of a program code (i.e., a data string) too large to be hashed at once. In this example, the program code is divided into the following four pieces to be hashed using a hash function 105 in the following designated order: a first piece of the program code 120, a second piece of the program code 220, a third piece of the program code 320, and a fourth piece of the program code 420. First piece of the program code 120 and a default seed 110 are first hashed using hash function 105 to obtain a first result hash 130. That is, first piece of the program code 120 and default seed 110 are input into hash function 105, and first result hash 130 is obtained as the output of hash function 105. Next, second piece of the program code 220 and first result hash 130 (i.e., the result hash obtained from hashing the piece of the program code immediately preceding second piece of the program code 220 in the designated order) are hashed using hash function 105 to obtain a second result hash 230. That is, second piece of the program code 220 and first result hash 130 are input into hash function 105, and second result hash 230 is obtained as the output of hash function 105.

Next, third piece of the program code 320 and second result hash 230 (i.e., the result hash obtained from hashing the piece of the program code immediately preceding third piece of the program code 320 in the designated order) are hashed using hash function 105 to obtain a third result hash 330. That is, third piece of the program code 320 and second result hash 230 are input into hash function 105, and third result hash 330 is obtained as an output of hash function 105. Next, fourth piece of the program code 420 and third result hash 330 (i.e., the result hash obtained from hashing the piece of the program code immediately preceding fourth piece of the program code 420 in the designated order) are hashed using hash function 105 to obtain a final result hash 430. That is, fourth piece of the program code 420 and third result hash 330 are input into hash function 105, and fourth result hash 430 is obtained as an output of hash function 105. Since fourth piece of the program code 420 is the piece of the program code that follows all other pieces of the program code in the designated order, the result hash obtained from hashing fourth piece of the program code 420 is the final result hash. It should be appreciated from the above example that this process of hashing a plurality of pieces of a data string (a plurality of pieces of a program code in the above example) is inherently sequential.

Hash functions are commonly used to authenticate a copy of a program code stored on a computing device before executing the copy of the program code. Put differently, hash functions are commonly used to ensure that a copy of a program code to be executed by a computing device is the same as the original program code. For example, a program code representing a video poker game to be operated by an EGM is created by a group of programmers at a first point in time. Before a copy of the program code is stored on the EGM, the program code is hashed using a hash function to obtain a result hash called an authentication final result hash. The authentication final result hash is encrypted and stored in association with a copy of the program code on the EGM. For instance, the copy of the program code and the encrypted authentication final result hash are sent to the EGM by a server through a data network and are stored on a memory device of the EGM. When the EGM receives an instruction to execute the copy of the program code, such as upon EGM startup, the EGM authenticates the copy of the program code before executing the copy of the program code. Specifically, the EGM authenticates the copy of the program code by: (a) hashing the copy of the program code stored on the EGM using the hash function (i.e., the same hash function used to obtain the authentication final result hash) to obtain a final result hash; (b) decrypting the authentication final result hash stored in association with the copy of the program code; and (c) comparing the authentication final result hash with the final result hash. If the authentication final result hash and the final result hash are the same, the EGM determines that the copy of the program code stored on the EGM is authentic (i.e., is the same as the program code hashed to obtain the authentication final result hash) and executes the copy of the program code. If the authentication final result hash and the final result hash are not the same, the EGM determines that the copy of the program code stored on the EGM is not authentic (i.e., is not the same as the program code hashed to obtain the authentication final result hash) and does not execute the copy of the program code.

As described above, in most cases a data string to be hashed is too large to hash at once, so the data string is divided into pieces and sequentially hashed in a designated order to obtain a final result hash. The final result hash is, in turn, compared to an authentication final result hash to authenticate the data string. More specifically, for each data string piece following the first data string piece (if any) in the designated order, that data string piece is hashed with the result hash obtained from hashing the immediately preceding data sting piece in the designated order to obtain a result hash, which is subsequently used as an input to the hash of the subsequent data string piece in the designated order. That is, for each data string piece following the first data string piece in the designated order, that data string piece cannot be hashed until the immediately preceding data string piece in the designated order has been hashed.

As the size of the data string to be authenticated using the hash function increases, the quantity of data string pieces that must be individually hashed increases. Since such hashing must be performed sequentially on each data string piece, as the size of the data string increases the time it takes to hash the data string pieces also increases. For example, it takes a typical EGM up to 30 seconds to hash and authenticate a single program code in such a manner. It also takes this typical EGM additional time to hash and authenticate other data, such as paytable data, sound data, image data, textual data, and video data. On EGMs including multiple program codes (e.g., EGMs configured to operate multiple games), this amount of time is increased by a multiple that is equal to the quantity of program codes. For example, an EGM including ten program codes to be authenticated takes over 300 seconds to hash and authenticate the program codes.

This relatively long authentication period increases the time it takes the EGM to initialize and, therefore, directly decreases the amount of time the EGM is available to be played by players and directly increases the amount of time casino (or other gaming establishment) personnel must supervise the EGM initialization process to ensure there are no problems. Further, since such authentication only determines whether a single final result hash is the same as a single authentication final result hash, there is no way for casino personnel to pinpoint where an unauthorized modification lies when authentication fails. There is, therefore, a continuing need to provide systems and methods that speed the authentication process by simultaneously hashing multiple pieces of a data string using a hash function, and to provide systems and methods that enable unauthorized modifications in data strings to be pinpointed.

SUMMARY

Various embodiments of the present disclosure provide systems and methods enabling parallel processing of hash functions using authentication checkpoint hashes. Generally, the system of the present disclosure is configured to authenticate a stored data string divided into a plurality of data string pieces by employing stored authentication checkpoint hashes to simultaneously hash a plurality of sets of the data string pieces. More specifically, in various embodiments, the system of the present disclosure is configured to authenticate a copy of a program code stored on an EGM and divided into a plurality of program code pieces by employing stored authentication checkpoint hashes to simultaneously hash a plurality of sets of the program code pieces to substantially decrease the time it takes the EGM to authenticate the copy of the program code.

At a first point in time, a processor hashes a data string divided into a plurality of data string pieces arranged in a designated order using a designated hash function to determine a plurality of authentication checkpoint hashes associated with the data string pieces. More specifically, a first data string piece in the designated order and a default seed are hashed using the designated hash function to obtain a first result hash, which is stored in association with the first data string piece as a first authentication checkpoint hash. For each subsequent data string piece in the designated order: (a) that data string piece, and (b) the result hash obtained from hashing the data string piece immediately preceding that data string piece in the designated order are hashed using the designated hash function to obtain a result hash, which is stored in association with that data string piece as an authentication checkpoint hash.

In various embodiments, the system of the present disclosure authenticates the data string at a second subsequent point in time by simultaneously hashing each of a plurality of sets of the data string pieces using the designated hash function and the authentication checkpoint hashes. It should be appreciated that, in certain embodiments, the system includes the processor used to determine the authentication checkpoint hashes, while in other embodiments the system does not include the processor used to determine the authentication checkpoint hashes. The system groups the data string pieces into a plurality of sets. Each of the sets includes at least one of the data string pieces. For each set, the system associates the authentication checkpoint hash associated with the data string piece following all other data string pieces of that set, if any, in the designated order with that set. The system simultaneously or substantially simultaneously performs a separate hash process on each set using the designated hash function. More specifically, for each set, the system hashes the data string pieces of that set using the designated hash function to determine a result hash, and compares that result hash with the authentication checkpoint hash associated with that set to determine whether the data string pieces of that set are authentic. For each set, the initial input to the designated hash function for the hash process for that set includes: (a) one of the data string pieces, and (b) either the default seed (if that set includes the first data string piece in the designated order) or one of the authentication checkpoint hashes (if that set does not include the first data string piece in the designated order). Since the data string pieces, the default seed, and the authentication checkpoint hashes are all stored by the system at the second subsequent point in time, the initial inputs to the designated hash function for the hash process of each set are known values. Thus, each hash process for each set may be performed simultaneously or substantially simultaneously because the hash processes require no initial inputs that are based on any result hashes obtained from any other hash processes of any other sets.

It should thus be appreciated that the system of the present disclosure enables data strings including large quantities of data string pieces to be authenticated by employing authentication checkpoint hashes to simultaneously hash multiple sets of the data string pieces. When applied to the authentication of a program code stored on an EGM, such simultaneous hashing causes the program code to be executed more quickly, which reduces loading or down time and increases the amount of time the EGM is available to be played by players.

Additional features and advantages are described herein, and will be apparent from, the following Detailed Description and the Figures.

BRIEF DESCRIPTION OF THE FIGURES

FIG. 6A is a schematic block diagram of an example of a network configuration of one embodiment of the system of the present disclosure.

DETAILED DESCRIPTION

Enabling Parallel Processing of Hash Functions Using Authentication Checkpoint Hashes Various embodiments of the present disclosure provide systems and methods enabling parallel processing of hash functions using authentication checkpoint hashes. Generally, the system of the present disclosure is configured to authenticate a stored data string divided into a plurality of data string pieces by employing stored authentication checkpoint hashes to simultaneously hash a plurality of sets of the data string pieces. It should be appreciated that the present disclosure may be employed with any suitable data string, such as (but not limited to): (a) data strings representing executable program code; (b) data strings representing graphical elements such as images or videos; (c) data strings representing audio elements such as sound effects or music; (d) data strings representing paytable elements for a game; data strings representing textual elements; and (e) data strings representing any other suitable data. While the present disclosure may be employed with any suitable data string, in the embodiments and examples of the present disclosure described below the data string is an executable program code.

Figure 1:
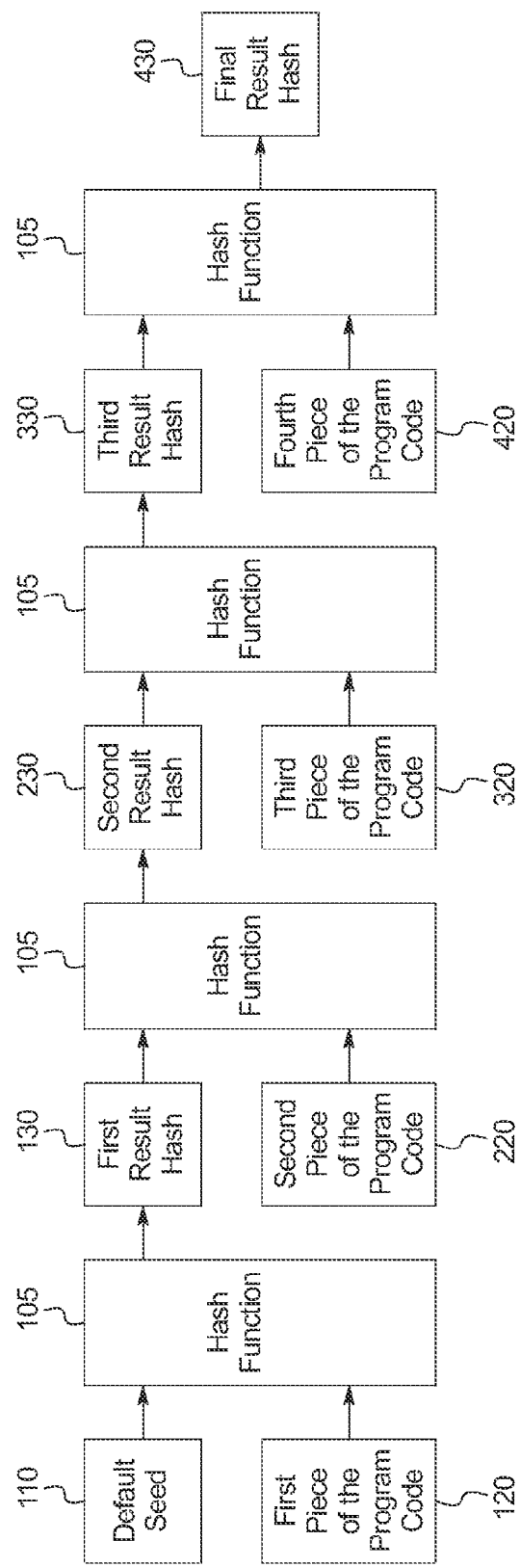
FIG. 1 is a block diagram illustrating an example hash of a program code that is too large to be hashed at once, wherein each of a plurality of pieces of the program code are sequentially hashed according to a designated order.

The program code is divided into a plurality of pieces that are arranged in a designated order. In various embodiments, before a system of the present disclosure can authenticate the program code, an authentication checkpoint hash must be determined for each piece of the program code by hashing the program code in the manner generally described above with respect to FIG. 1. More particularly, for each piece of the program code, the result hash obtained as a result of that piece of the program code and either: (a) the default seed, or (b) the result hash obtained from hashing the piece of the program code immediately preceding that piece of the program code in the designated order being hashed is stored as the authentication checkpoint hash associated with that piece of the program code. The authentication checkpoint hash associated with the piece of the program code following all other pieces of the program code in the designated order is referred to herein as an authentication final result hash.

In one example, a program code includes three pieces arranged in the following designated order: a first piece of the program code, a second piece of the program code, and a third piece of the program code. In this example, the first piece of the program code is associated with a first authentication checkpoint hash (which is the same as the result hash obtained from hashing the first piece of the program code and the default seed), the second piece of the program code is associated with a second authentication checkpoint hash (which is the same as the result hash obtained from hashing the second piece of the program code with the result hash obtained from hashing the first piece of the program code), and the third piece of the program code is associated with a third authentication checkpoint hash (which is the same as the result hash obtained from hashing the third piece of the program code with the result hash obtained from hashing the second piece of the program code). The third authentication checkpoint hash is the authentication final result hash because the third piece of the program code is the piece of the program code following all other pieces of the program code in the designated order.

It should be appreciated that, in certain embodiments, the system of the present disclosure determines the authentication checkpoint hashes, while in other embodiments the system of the present disclosure does not determine the authentication checkpoint hashes.

After an authentication checkpoint hash has been determined for each piece of the program code, the system groups the pieces of the program code into at least two sets of at least one of the pieces of the program code according to the designated order. That is, each of the sets includes one or a plurality of the pieces of the program code and, if the set includes a plurality of the pieces of the program code, those pieces of the program code of the set are arranged according to the designated order. It should be appreciated that any suitable quantity of sets may be employed, and that each set may include any suitable quantity of pieces of the program code.

The quantity of sets is determined at the time the data string is initially hashed. In certain embodiments, the quantity of sets is determined based on processor power or based on the number of processors of the system. In one example in which the system includes two processors, the quantity of sets is two (i.e., equal to the number of processors). In another example in which the system includes four processors, the quantity of sets is four (i.e., equal to the number of processors). It should be appreciated that the quantity of sets to be employed may be determined in any other suitable manner and based on any other suitable factors.

Continuing with the above example, the system determines a first set of the pieces of the program code including the first piece of the program code and a second set of the pieces of the program code including the second and third pieces of the program code.

In various embodiments, the system associates one of the authentication checkpoint hashes with each of the sets. More specifically, for each of the sets: (a) if that set includes the piece of the program code following all other pieces of the program code in the designated order, the system associates the authentication final result hash with that set; and (b) if that set does not include the piece of the program code following all other pieces of the program code in the designated order, the system associates the authentication checkpoint hash associated with the piece of the program code following all other pieces of the program code of the set, if any, in the designated order with that set.

Continuing with the above example, the system associates: (a) the first set with the first authentication checkpoint hash because the only piece of the program code included in the first set is the first piece of the program code, which is associated with the first authentication checkpoint hash; and (b) the second set with the authentication final result hash because the second set includes the piece of the program code that follows all other pieces of the program code in the designated order (i.e., includes the third piece of the program code).

After associating one of the authentication checkpoint hashes with each of the sets, in various embodiments, to authenticate the program code the system simultaneously or substantially simultaneously performs a separate hash process on each set using the designated hash function. More specifically, for each set, the system hashes the pieces of the program code of that set using the hash function to determine a result hash, and compares that result hash with the authentication checkpoint hash associated with that set to determine whether the pieces of the program code of that set are authentic. For each set, the initial input to the designated hash function for the hash process for that set includes: (a) one of the pieces of the program code, and (b) either a default seed or one of the authentication checkpoint hashes. It should be appreciated that since: (a) the pieces of the program code, (b) the default seed, and (c) the authentication checkpoint hashes are stored by the system, the initial inputs to the designated hash function for each of the hash processes are known values. That is, each hash process for each set may be performed simultaneously because the hash processes require no initial inputs that are based on any result hashes obtained from any other hash processes of any other sets.

Continuing with the above example, the system: (a) hashes the first piece of the program code of the first set using the designated hash function to obtain a result hash and compares that result hash to the first authentication checkpoint hash; and simultaneously (b) hashes the second and third pieces of the program code of the second set using the designated hash function to obtain a result hash and compares that result hash to the authentication final result hash. Further, in this example, the initial input to the hash process of the first set includes: (a) the first piece of the program code, and (b) the default seed, each of which are known values, and the initial input to the hash process of the second set includes: (a) the second piece of the program code, and (b) the first authentication checkpoint hash, each of which are known values.

More specifically, for the set that includes the piece of the program code that precedes all other pieces of the program code in the designated order, the system: (a) uses the designated hash function to hash: (i) the piece of the program code that precedes all other pieces of the program code in the designated order, and (ii) a default seed to obtain a result hash; (b) for each of any remaining pieces of the program code of that set, uses the designated hash function to hash: (i) that piece of the program code, and (ii) the result hash obtained from hashing the piece of the program code immediately preceding that piece of the program code in the designated order to obtain a result hash; and (c) determines whether the result hash obtained from hashing the piece of the program code of that set that follows all other pieces of the program code of that set, if any, in the designated order is the same as the authentication checkpoint hash associated with that set. If the result hash obtained from hashing the piece of the program code of that set that follows all other pieces of the program code of that set, if any, in the designated order is the same as the authentication checkpoint hash associated with that set, the system authenticates the piece(s) of the program code of that set. If not, the system does not authenticate the piece(s) of the program code of that set.

Continuing with the above example, the first set includes the piece of the program code that precedes all other pieces of the program code in the designated order (i.e., the first piece of the program code). Accordingly, the system: hashes the first piece of the program code and the default seed using the designated hash function to obtain a first result hash, and compares the first result hash to the first authentication checkpoint hash. If the first result hash and the first authentication checkpoint hash are the same, the first piece of the program code is authentic. If the first result hash and the first authentication checkpoint hash are different, the first piece of the program code is not authentic.

For each remaining set, the system: (a) uses the designated hash function to hash: (i) the piece of the program code of that set that precedes all other pieces of the program code of that set, if any, in the designated order; and (ii) the authentication checkpoint hash associated with the set including the piece of the program code immediately preceding that piece of the program code in the designated order to obtain a result hash; (b) for each of any remaining pieces of the program code of that set, uses the designated hash function to hash: (i) that piece of the program code; and (ii) the result hash obtained from hashing the piece of the program code immediately preceding that piece of the program code in the designated order to obtain a result hash; and (c) determines whether the result hash obtained from hashing the piece of the program code of that set that follows all other pieces of the program code of that set, if any, in the designated order is the same as the authentication checkpoint hash associated with that set. For each remaining set, if the result hash obtained from hashing the piece of the program code of that set that follows all other pieces of the program code of that set, if any, in the designated order is the same as the authentication checkpoint hash associated with that set, the system authenticates the piece(s) of the program code of that set. If not, the system does not authenticate the piece(s) of the program code of that set.

Continuing with the above example, the system: (a) hashes the first authentication checkpoint hash and the second piece of the program code using the designated hash function to obtain a second result hash, (b) hashes the second result hash and the third piece of the program code to obtain a third result hash, and (c) compares the third result hash with the authentication final result hash. If the third result hash and the authentication final result hash are the same, the second and third pieces of the program code are authentic. If the third result hash and the authentication final result hash are different, the second and third pieces of the program code are not authentic.

It should be appreciated that the system may simultaneously perform such hashing processes in any suitable manner. In certain embodiments in which the system includes a quantity of processors that is greater than or equal to a quantity of the sets, the system assigns each of the hashing processes to a different one of the processors to perform. In other embodiments in which the system includes a quantity of processors that is less than a quantity of the sets, the system assigns each of the processors a certain number of the hashing processes to perform. For example, in a system including two processors and four hashing processes to perform, the system assigns two of the hashing processes to each of the processors to perform. In further embodiments, the system dynamically assigns hashing processes to the processors. In such embodiments, the system initially assigns each processor one or more hash processes to perform. The system subsequently assigns at least one hash process that has not been performed to whichever processor is the first to complete that processor's assigned hash processes. For example, in a system including two processors and three hash processes to perform, the system initially assigns each of the processors one of the hash processes to perform. The system subsequently assigns the remaining hash process to whichever processor finishes performing that processor's assigned hash process first. In other embodiments, the system takes advantage of hyperthreading to enable one or more processors to each act as a plurality of processors.

In various embodiments, for each set, when the result hash obtained from hashing the piece of the program code of that set that follows all other pieces of the program code of that set, if any, in the designated order is not the same as the authentication checkpoint hash associated with that set, the system generates an error message and, in certain embodiments, stores the error message, displays the error message, and/or transmits the error message to a third party. It should thus be appreciated that, in such embodiments, the system identifies which of the sets includes the piece or pieces of the program code that are not authentic.

Figure 2:
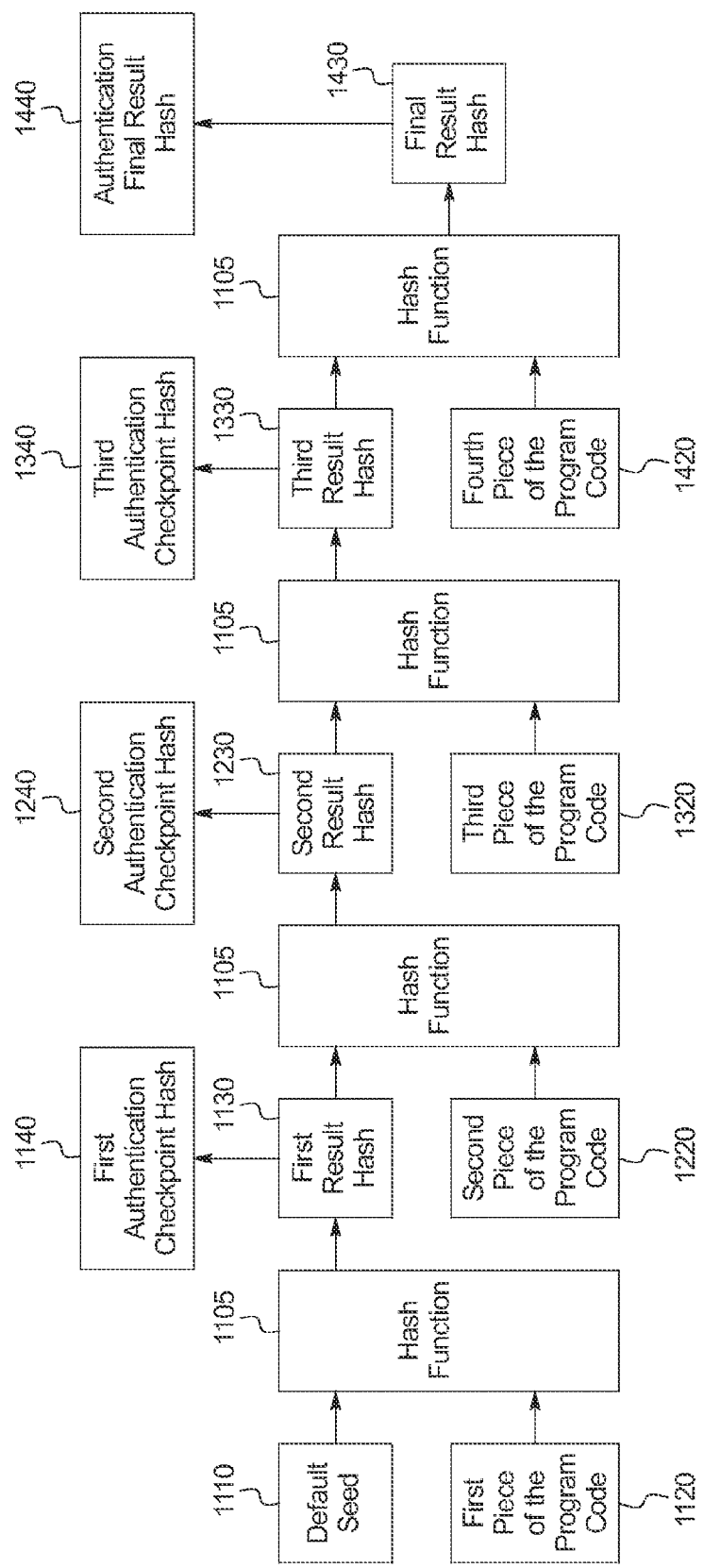
FIG. 2 is a block diagram illustrating an example initial hash of a program code including four pieces, the results of which are used to determine authentication checkpoint hashes associated with the four pieces of the program code.

As generally explained above, hash functions are commonly used to authenticate a copy of a program code before executing the copy of the program code. FIGS. 2 to 5 below are block diagrams illustrating how example systems of the present disclosure employ authentication checkpoint hashes to simultaneously hash a plurality of sets of one or more pieces of a copy of a program code stored in an EGM. In this example, a program code representing a video slot game to be operated by an EGM is created by a group of programmers at a first point in time. Before a copy of the program code is stored on the EGM, the program code is divided into a plurality of pieces and hashed using a designated hash function to obtain a plurality of authentication checkpoint hashes. FIG. 2 is a block diagram illustrating this initial hash of the program code, which is used to determine the authentication checkpoint hash associated with each piece of the program code. In this example, the program code is divided into the following four pieces to be hashed using hash function 1105 in the following designated order: a first piece of the program code 1120, a second piece of the program code 1220, a third piece of the program code 1320, and a fourth piece of the program code 1420.

First piece of the program code 1120 and a default seed 1110 are first hashed using hash function 1105 to obtain a first result hash 1130. That is, first piece of the program code 1120 and default seed 1110 are input into hash function 1105, and first result hash 1130 is obtained as the output of hash function 1105. First result hash 1130 is stored in association with first piece of the program code 1120 as first authentication checkpoint hash 1140. Next, second piece of the program code 1220 and first result hash 1130 (i.e., the result hash obtained from hashing the piece of the program code immediately preceding second piece of the program code 1220 in the designated order) are hashed using hash function 1105 to obtain a second result hash 1230. That is, second piece of the program code 1220 and first result hash 1130 are input into hash function 1105, and second result hash 1230 is obtained as the output of hash function 1105. Second result hash 1230 is stored in association with second piece of the program code 1220 as second authentication checkpoint hash 1240.

Next, third piece of the program code 1320 and second result hash 1230 (i.e., the result hash obtained from hashing the piece of the program code immediately preceding third piece of the program code 1320 in the designated order) are hashed using hash function 1105 to obtain a third result hash 1330. That is, third piece of the program code 1320 and second result hash 1230 are input into hash function 1105, and third result hash 1330 is obtained as an output of hash function 1105. Third result hash 1330 is stored in association with third piece of the program code 1320 as third authentication checkpoint hash 1340. Next, fourth piece of the program code 1420 and third result hash 1330 (i.e., the result hash obtained from hashing the piece of the program code immediately preceding fourth piece of the program code 1420 in the designated order) are hashed using hash function 1105 to obtain a fourth result hash 1430. That is, fourth piece of the program code 1420 and third result hash 1330 are input into hash function 1105, and fourth result hash 1430 is obtained as an output of hash function 1105. Fourth result hash 1430 is stored in association with fourth piece of the program code 1420 as an authentication final result hash 1440 because fourth piece of the program code 1420 is the piece of the program code that follows all other pieces of the program code in the designated order.

Figure 3:
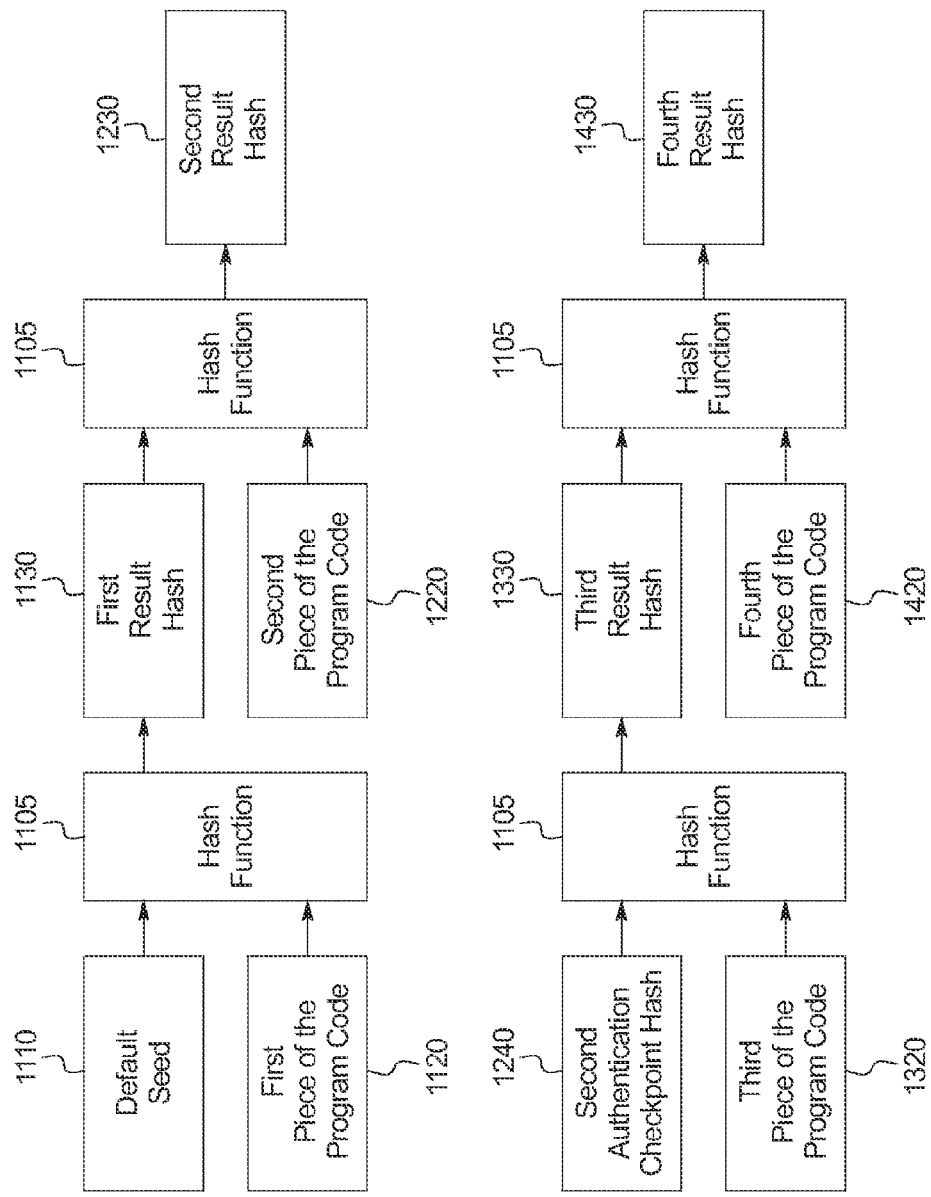
FIG. 3 is a block diagram illustrating an example of two hashing processes being performed simultaneously for two sets of two pieces of a copy of the program code of FIG. 2, wherein the hashing processes employ the authentication checkpoint hashes.
Figure 4:
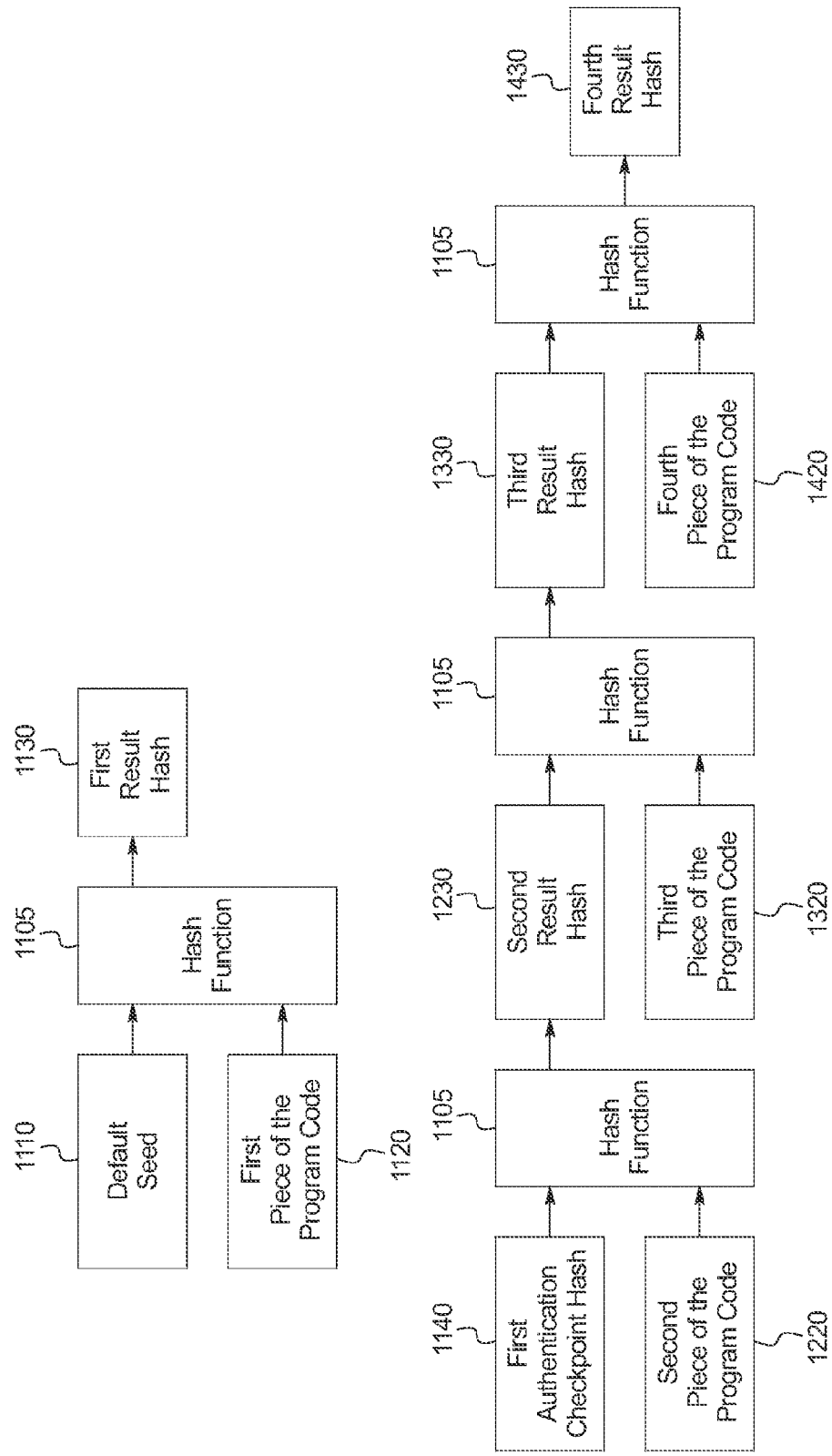
FIG. 4 is a block diagram illustrating an example of two hashing processes being performed simultaneously for two sets of one or more pieces of a copy of the program code of FIG. 2, wherein the hashing processes employ the authentication checkpoint hashes.
Figure 5:
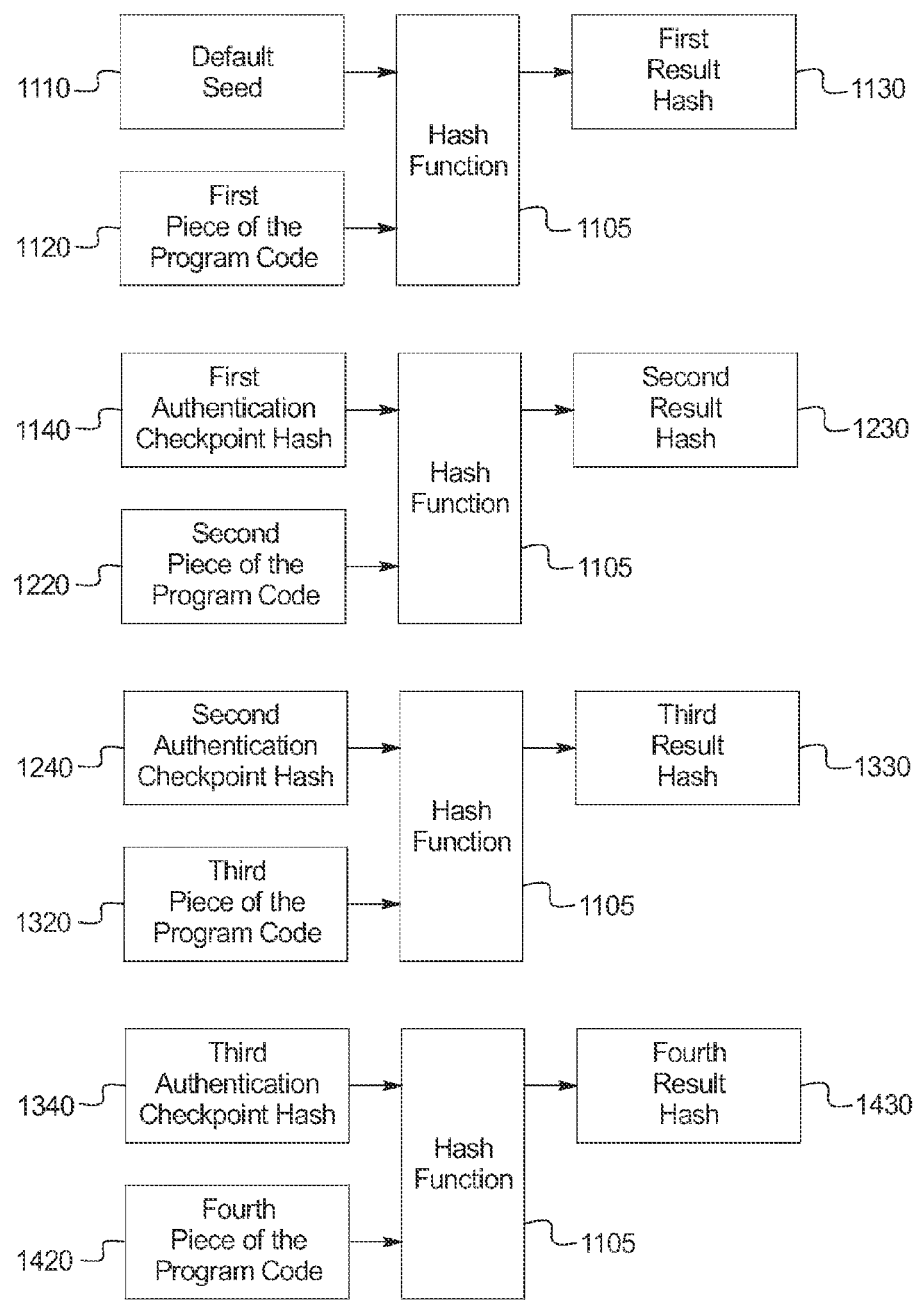
FIG. 5 is a block diagram illustrating an example of four hashing processes being performed simultaneously for four sets of one piece of a copy of the program code of FIG. 2, wherein the hashing processes employ the authentication checkpoint hashes.

The authentication checkpoint hashes are encrypted and stored in association with the copy of the program code on the EGM. For instance, the copy of the program code and the encrypted authentication checkpoint hashes are sent to the EGM by a server through a data network and are stored on a memory device of the EGM. When the EGM receives an instruction to initialize the copy of the program code, such as upon EGM startup, the EGM authenticates the copy of the program code before executing the copy of the program code by employing the authentication checkpoint hashes to simultaneously hash each of a plurality of sets of one or more of the pieces of the program code. FIGS. 3 to 5 (described below) illustrate different examples of the copy of the program code being authenticated via parallel processing of hash functions employing authentication checkpoint hashes.

FIG. 3 is a block diagram illustrating one example of how the copy of the program code is authenticated via parallel processing of hash functions employing authentication checkpoint hashes. More specifically, in this example, two sets each including two pieces of the copy of the program code are hashed simultaneously. The copy of the program code in this example is divided into the following four pieces arranged in the following designated order: first piece of the copy of the program code 1120, second piece of the copy of the program code 1220, third piece of the copy of the program code 1320, and fourth piece of the copy of the program code 1420. In this example, the pieces of the copy of the program code are grouped into the following two sets: (a) a first set includes first piece of the copy of the program code 1120 and second piece of the copy of the program code 1220, and (b) a second set includes third piece of the copy of the program code 1320 and fourth piece of the copy of the program code 1420. The system associates second authentication checkpoint hash 1240 (i.e., the authentication checkpoint hash associated with the piece of the copy of the program code following all other pieces of the copy of the program code of the first set in the designated order) with the first set, and associates authentication final result hash 1440 with the second set because the second set includes the piece of the copy of the program code following all other pieces of the copy of the program code in the designated order.

In this example, a first processor of the system performs a first hash process 100 (described below) on the first set and a second processor of the system simultaneously performs a second hash process 200 (described below) on the second set. More specifically, the first processor performs first hash process 100 by first hashing first piece of the copy of the program code 1120 and a default seed 1110 using hash function 1105 to obtain a first result hash 1130. That is, the first processor inputs first piece of the copy of the program code 1120 and default seed 1110 into hash function 1105, and obtains first result hash 1130 as the output of hash function 1105. Next, the first processor hashes second piece of the copy of the program code 1220 and first result hash 1130 using hash function 1105 to obtain a second result hash 1230. That is, the first processor inputs second piece of the copy of the program code 1220 and first result hash 1130 into hash function 1105, and obtains second result hash 1230 as the output of hash function 1105.

Simultaneously, the second processor performs second hash process 200 by first hashing third piece of the copy of the program code 1320 and second authentication checkpoint hash 1240 using hash function 1105 to obtain a third result hash 1330. That is, the second processor inputs third piece of the copy of the program code 1320 and second authentication checkpoint hash 1240 into hash function 1105, and obtains third result hash 1330 as an output of hash function 1105. Second hash process 200 and first hash process 100 may be performed simultaneously because second authentication checkpoint hash 1240, which is stored by the system, is input into hash function 1105 rather than second result hash 1230. Thus, second hash process 200 is not required to wait until second result hash 1230 is determined to begin. Next, the second processor hashes fourth piece of the copy of the program code 1420 and third result hash 1330 using hash function 1105 to obtain a fourth result hash 1430. That is, the second processor inputs fourth piece of the copy of the program code 1420 and third result hash 1330 into hash function 1105, and obtains fourth result hash 1430 as an output of hash function 1105.

After determining second result hash 1230 and fourth result hash 1430, the system determines whether to authorize the copy of the program code for execution by comparing second result hash 1230 with second authentication checkpoint hash 1240 and by comparing fourth result hash 1430 with authentication final result hash 1440. If both: (a) second result hash 1230 and second authentication checkpoint hash 1240 are the same, and (b) fourth result hash 1430 and authentication final result hash 1440 are the same, the system determines that the copy of the program code is authentic (i.e., is the same as the program code hashed to obtain the authentication checkpoint hashes), authorizes the copy of the program code to be executed, and executes the copy of the program code. If, on the other hand: (a) second result hash 1230 and second authentication checkpoint hash 1240 are not the same, and/or (b) fourth result hash 1430 and authentication final result hash 1440 are not the same, the system determines that the copy of the program code is not authentic (i.e., is not the same as the program code hashed to obtain the authentication checkpoint hashes), and does not authorize the copy of the program code for execution.

FIG. 4 is a block diagram illustrating another example of how the copy of the program code is authenticated via parallel processing of hash functions employing authentication checkpoint hashes. More specifically, in this example, one set of one piece of the program code and one set of three pieces of the program code are hashed simultaneously. The copy of the program code in this example is divided into the same pieces described above with respect to FIG. 3. In this example, the pieces of the copy of the program code are grouped into the following two sets: (a) a first set includes first piece of the copy of the program code 1120; and (b) a second set includes second piece of the copy of the program code 1220, third piece of the copy of the program code 1320 and fourth piece of the copy of the program code 1420. The system associates first checkpoint hash 1140 (i.e., the authentication checkpoint hash associated with the only piece of the copy of the program code of the set) with the first set, and authentication final result hash 1440 with the second set because the second set includes the piece of the copy of the program code following all other pieces of the copy of the program code in the designated order.

In this example, a first processor of the system performs a first hash process 300 (described below) on the first set and a second processor of the system simultaneously performs a second hash process 400 (described below) on the second set. More specifically, the first processor performs first hash process 300 by hashing first piece of the copy of the program code 1120 and a default seed 1110 using hash function 1105 to obtain a first result hash 1130. That is, the first processor inputs first piece of the copy of the program code 1120 and default seed 1110 into hash function 1105, and obtains first result hash 1130 as the output of hash function 1105.

Simultaneously, the second processor performs second hash process 400 by first hashing second piece of the copy of the program code 1220 and first authentication checkpoint hash 1140 using hash function 1105 to obtain a second result hash 1230. That is, the second processor inputs second piece of the copy of the program code 1220 and first authentication checkpoint hash 1140 into hash function 1105, and obtains second result hash 1230 as the output of hash function 1105. Second hash process 400 and first hash process 300 may be performed simultaneously because first authentication checkpoint hash 1140, which is stored by the system, is input into hash function 1105 rather than first result hash 1130. Thus, second hash process 400 is not required to wait until first result hash 1130 is determined to begin. Next, the second processor hashes third piece of the copy of the program code 1320 and second checkpoint hash 1240 using hash function 1105 to obtain a third result hash 1330. That is, the second processor inputs third piece of the copy of the program code 1320 and second checkpoint hash 1240 into hash function 1105, and obtains third result hash 1330 as an output of hash function 1105. Next, the second processor hashes fourth piece of the copy of the program code 1420 and third result hash 1330 using hash function 1105 to obtain a fourth result hash 1430. That is, the second processor inputs fourth piece of the copy of the program code 1420 and third result hash 1330 into hash function 1105, and obtains fourth result hash 1430 as an output of hash function 1105.

After determining first result hash 1130 and fourth result hash 1430, the system determines whether to authorize the copy of the program code for execution by comparing first result hash 1130 with first authentication checkpoint hash 1140 and by comparing fourth result hash 1430 with authentication final result hash 1440. If both: (a) first result hash 1130 and first authentication checkpoint hash 1140 are the same, and (b) fourth result hash 1430 and authentication final result hash 1440 are the same, the system determines that the copy of the program code is authentic (i.e., is the same as the program code hashed to determine the authentication checkpoint hashes), authorizes the copy of the program code to be executed, and executes the copy of the program code. If, on the other hand: (a) first result hash 1130 and first authentication checkpoint hash 1140 are not the same, and/or (b) fourth result hash 1430 and authentication final result hash 1440 are not the same, the system determines that the copy of the program code is not authentic (i.e., is not the same as the program code hashed to determine the authentication checkpoint hashes), and does not authorize the copy of the program code for execution.

FIG. 5 is a block diagram illustrating another example of how the copy of the program code is authenticated via parallel processing of hash functions employing checkpoint hashes. More specifically, in this example, four sets each including only one piece of the copy of the program code are hashed simultaneously. The copy of the program code in this example is divided into the same pieces described above with respect to FIGS. 3 and 4. In this example, the pieces of the copy of the program code are grouped into the following four sets of the pieces of the copy of the program code: (a) a first set includes first piece of the copy of the program code 1120, (b) a second set includes second piece of the copy of the program code 1220, (c) a third set includes third piece of the copy of the program code 1320, and (d) a fourth set includes fourth piece of the copy of the program code 1420. The system associates first checkpoint hash 1140 with the first set (i.e., the authentication checkpoint hash associated with the only piece of the copy of the program code of the set), second checkpoint hash 1240 with the second set (i.e., the authentication checkpoint hash associated with the only piece of the copy of the program code of the set), third checkpoint hash 1340 with the third set (i.e., the authentication checkpoint hash associated with the only piece of the copy of the program code of the set), and authentication final result hash 1440 with the fourth set because the fourth set includes the piece of the copy of the program code following each other piece of the copy of the program code in the designated order.

In this example, a first processor of the system performs a first hash process 500 (described below) on the first set, a second processor of the system simultaneously performs a second hash process 600 (described below) on the second set, a third processor of the system simultaneously performs a third hash process 700 (described below) on the third set, and a fourth processor of the system simultaneously performs a fourth hash process 800 (described below) on the fourth set. More specifically, the first processor performs first hash process 500 by hashing first piece of the copy of the program code 1120 and a default seed 1110 using hash function 1105 to obtain a first result hash 1130. That is, the first processor inputs first piece of the copy of the program code 1120 and default seed 1110 into hash function 1105, and obtains first result hash 1130 as the output of hash function 1105.

Simultaneously, the second processor performs second hash process 600 by hashing second piece of the copy of the program code 1220 and first authentication checkpoint hash 1140 using hash function 1105 to obtain a second result hash 1230. That is, the second processor inputs second piece of the copy of the program code 1220 and first authentication checkpoint hash 1140 into hash function 1105, and obtains second result hash 1230 as the output of hash function 1105. Second hash process 600 and first hash process 500 may be performed simultaneously because first authentication checkpoint hash 1140, which is stored by the system, is input into hash function 1105 rather than first result hash 1130. Thus, second hash process 600 is not required to wait until first result hash 1130 is determined to begin.

Simultaneously, the third processor performs third hash process 700 by hashing third piece of the copy of the program code 320 and second authentication checkpoint hash 1240 using hash function 1105 to obtain a third result hash 1330. That is, the third processor inputs third piece of the copy of the program code 1320 and second authentication checkpoint hash 1240 into hash function 1105, and obtains third result hash 1330 as the output of hash function 1105. Third hash process 700 and second hash process 600 may be performed simultaneously because second authentication checkpoint hash 1240, which is stored by the system, is input into hash function 1105 rather than second result hash 1230. Thus, third hash process 700 is not required to wait until second result hash 1230 is determined to begin.

Simultaneously, the fourth processor performs fourth hash process 800 by hashing fourth piece of the copy of the program code 1420 and third authentication checkpoint hash 1340 using hash function 1105 to obtain a fourth result hash 1430. That is, the fourth processor inputs fourth piece of the copy of the program code 1420 and third authentication checkpoint hash 1340 into hash function 1105, and obtains fourth result hash 1430 as the output of hash function 1105. Fourth hash process 800 and third hash process 700 may be performed simultaneously because third authentication checkpoint hash 1340, which is stored by the system, is input into hash function 1105 rather than third result hash 1330. Thus, fourth hash process 800 is not required to wait until third result hash 1330 is determined to begin.

After determining first result hash 1130, second result hash 1230, third result hash 1330, and fourth result hash 1430, the system determines whether to authorize the copy of the program code for execution by comparing first result hash 1130 with first authentication checkpoint hash 1140, second result hash 1230 with second authentication checkpoint hash 1240, third result hash 1330 with third authentication checkpoint hash 1340, and fourth result hash 1430 with authentication final result hash 1440. If: (a) first result hash 1130 and first authentication checkpoint hash 1140 are the same, (b) second result hash 1230 and second authentication checkpoint hash 1240 are the same, (c) third result hash 1330 and third authentication checkpoint hash 1340 are the same, and (d) fourth result hash 1430 and authentication final result hash 1440 are the same, the system determines that the copy of the program code is authentic (i.e., is the same as the program code hashed to determine the authentication checkpoint hashes), authorizes the copy of the program code to be executed, and executes the copy of the program code. If, on the other hand: (a) first result hash 1130 and first authentication checkpoint hash 1140 are not the same, (b) second result hash 1230 and second authentication checkpoint hash 1240 are not the same, (c) third result hash 1330 and third authentication checkpoint hash 1340 are not the same, and/or (d) fourth result hash 1430 and authentication final result hash 1440 are not the same, the system determines that the copy of the program code is not authentic (i.e., is not the same as the program code hashed to determine the authentication checkpoint hashes), and does not authorize the copy of the program code for execution.

Systems

It should be appreciated that the above-described embodiments of the present disclosure may be implemented in accordance with or in conjunction with one or more of a variety of different types of systems, such as, but not limited to, those described below.

The present disclosure contemplates a variety of different systems each having one or more of a plurality of different features, attributes, or characteristics. It should be appreciated that a "system" as used herein refers to various configurations of: (a) one or more central servers, central controllers, or remote hosts; (b) one or more electronic gaming machines (EGMs); and/or (c) one or more personal devices, such as desktop computers, laptop computers, tablet computers or computing devices, personal digital assistants (PDAs), mobile telephones such as smart phones, and other mobile computing devices.

Thus, in various embodiments, the system of the present disclosure includes: (a) one or more EGMs in combination with one or more central servers, central controllers, or remote hosts; (b) one or more personal devices in combination with one or more central servers, central controllers, or remote hosts; (c) one or more personal devices in combination with one or more EGMs; (d) one or more personal devices, one or more EGMs, and one or more central servers, central controllers, or remote hosts in combination with one another; (e) a single EGM; (f) a plurality of EGMs in combination with one another; (g) a single personal device; (h) a plurality of personal devices in combination with one another; (i) a single central server, central controller, or remote host; and/or (j) a plurality of central servers, central controllers, or remote hosts in combination with one another.

For brevity and clarity, each EGM and each personal device of the present disclosure is collectively referred to herein as an "EGM." Additionally, for brevity and clarity, unless specifically stated otherwise, "EGM" as used herein represents one EGM or a plurality of EGMs, and "central server, central controller, or remote host" as used herein represents one central server, central controller, or remote host or a plurality of central servers, central controllers, or remote hosts.

As noted above, in various embodiments, the system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the system illustrated in FIG. 6A includes a plurality of EGMs 2010 that are each configured to communicate with a central server, central controller, or remote host 2056 through a data network 2058.

In certain embodiments in which the system includes an EGM in combination with a central server, central controller, or remote host, the central server, central controller, or remote host is any suitable computing device (such as a server) that includes at least one processor and at least one memory device or storage device. As further described below, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the system includes a plurality of EGMs, one or more of the EGMs are thin client EGMs and one or more of the EGMs are thick client EGMs. In other embodiments in which the system includes one or more EGMs, certain functions of one or more of the EGMs are implemented in a thin client environment, and certain other functions of one or more of the EGMs are implemented in a thick client environment. In one such embodiment in which the system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located; (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the system includes a central server, central controller, or remote host and an EGM each located in a different gaming establishment in a same geographic area, such as a same city or a same state. It should be appreciated that systems in which the data network is a WAN are substantially identical to systems in which the data network is a LAN, though the quantity of EGMs in such systems may vary relative to one another.

In further embodiments in which the system includes: (a) an EGM configured to communicate with a central server, central controller, or remote host through a data network; and/or (b) a plurality of EGMs configured to communicate with one another through a data network, the data network is an internet or an intranet. In certain such embodiments, an Internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central server, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 6B:
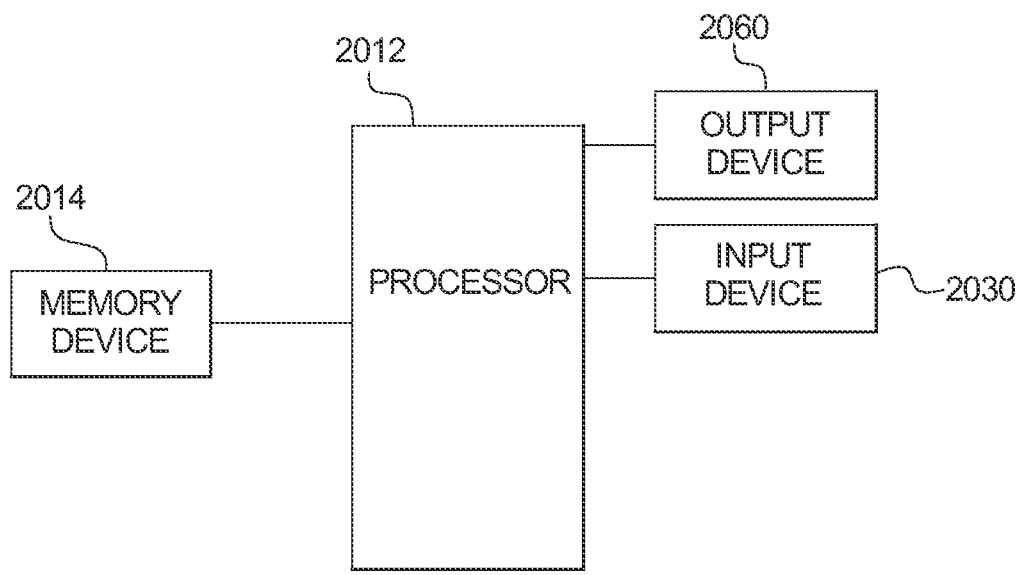
FIG. 6B is a schematic block diagram of an electronic configuration of one embodiment of the system of the present disclosure.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 6B illustrates an example EGM including a processor 2012.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 6B includes a memory device 2014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

Figure 7A:
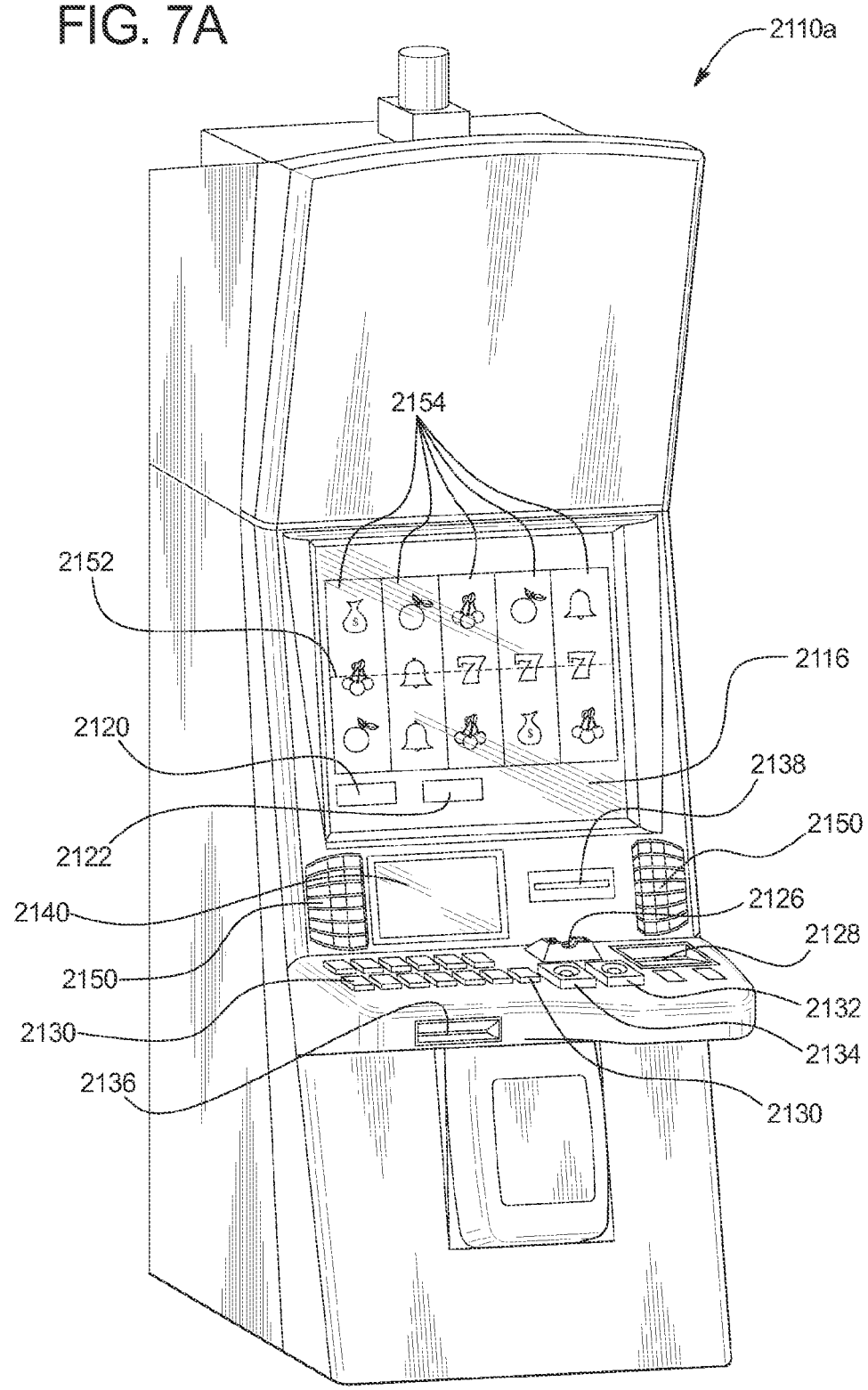
FIGS. 7A and 7B are perspective views of example alternative embodiments of the system of the present disclosure.
Figure 7B:
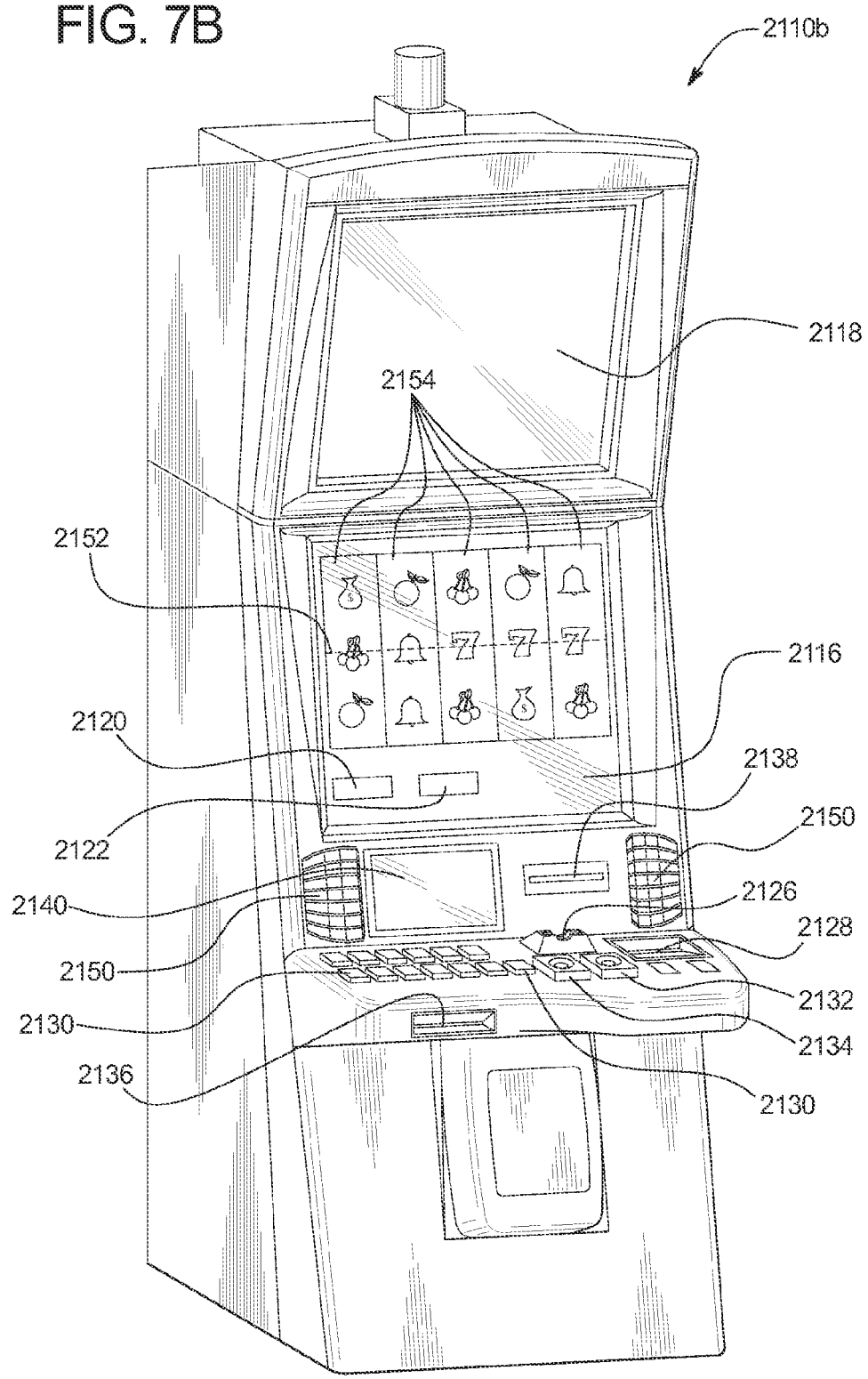

In various embodiments, the EGM includes one or more input devices. The input devices may include any suitable device that enables an input signal to be produced and received by the at least one processor of the EGM. The example EGM illustrated in FIG. 6B includes at least one input device 2030. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 7A and 7B illustrate example EGMs that each include the following payment devices: (a) a combined bill and ticket acceptor 2128, and (b) a coin slot 2126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs illustrated in FIGS. 7A and 7B each include a game play activation device in the form of a game play initiation button 2032. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 7A and 7B each include a cash out device in the form of a cash out button 2134.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs illustrated in FIGS. 7A and 7B each include a card reader 2138. The card reader is configured to read a player identification card inserted into the card reader.

In various embodiments, the EGM includes one or more output devices. The example EGM illustrated in FIG. 7B includes at least one output device 2060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent, and (e) a bet display configured to display an amount wagered for one or more plays of one or more games. The example EGM illustrated in FIG. 7A includes a central display device 2116, a player tracking display 2140, a credit display 2120, and a bet display 2122. The example EGM illustrated in FIG. 7B includes a central display device 2116, an upper display device 2118, a player tracking display 2140, a player tracking display 2140, a credit display 2120, and a bet display 2122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs illustrated in FIGS. 7A and 7B each include ticket generator 2136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs illustrated in FIGS. 7A and 7B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication ports that enable the EGMs to communicate and operate with one or more external peripherals.

As generally described above, in certain embodiments, such as the example EGMs illustrated in FIGS. 7A and 73, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs shown in FIGS. 7A and 7B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal devices of the present disclosure are collectively referred to herein as "EGMs." Accordingly, it should be appreciated that certain of the example EGMs described above include certain elements that may not be included in all EGMs. For example, the payment device of a personal device such as a mobile telephone may not include a coin acceptor, while in certain instances the payment device of an EGM located in a gaming establishment may include a coin acceptor.

Operation of Primary or Base Games and/or Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the system generates the game outcome(s) and/or the award(s) to be provided based on the associated probabilities. In these embodiments, since the system generates game outcomes and/or awards randomly or based on one or more probability calculations, there is no certainty that the system will ever provide any specific game outcome and/or award.

In certain embodiments, the system maintains one or more predetermined pools or sets of predetermined game outcomes and/or awards. In certain such embodiments, upon generation or receipt of a game outcome and/or award request, the system independently selects one of the predetermined game outcomes and/or awards from the one or more pools or sets. The system flags or marks the selected game outcome and/or award as used. Once a game outcome or an award is flagged as used, it is prevented from further selection from its respective pool or set; that is, the system does not select that game outcome or award upon another game outcome and/or award request. The system provides the selected game outcome and/or award. At least U.S. Pat. Nos. 7,470,183; 7,563,163; and 7,833,092 and U.S. Patent Application Publication Nos. 2005/0148382, 2006/0094509, and 2009/0181743 describe various examples of this type of award determination.

In certain embodiments, the system determines a predetermined game outcome and/or award based on the results of a bingo, keno, or lottery game. In certain such embodiments, the system utilizes one or more bingo, keno, or lottery games to determine the predetermined game outcome and/or award provided for a primary game and/or a secondary game. The system is provided or associated with a bingo card. Each bingo card consists of a matrix or array of elements, wherein each element is designated with separate indicia. After a bingo card is provided, the system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S. Patent Application Publication No. 2011/0028201 describe various examples of this type of award determination.

In certain embodiments in which the system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the system includes a real-time or online accounting and gaming information system configured to communicate with the central server, central controller, or remote host. In this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281541 describe various examples of such accounting systems.

As noted above, in various embodiments, the system includes one or more executable game programs executable by at least one processor of the system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the system. In certain such embodiments, the system includes one or more paylines associated with the reels. The example EGMs shown in FIGS. 7A and 7B each include a payline 2152 and a plurality of reels 2154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The system enables a wager to be placed on one or more of such paylines to activate such paylines. In other embodiments in which one or more paylines are formed between at least two adjacent symbol display areas, the system enables a wager to be placed on a plurality of symbol display areas, which activates those symbol display areas.

In various embodiments, the system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of ways to win award determinations.

In various embodiments, the system includes a progressive award. Typically, a progressive award includes an initial amount and an additional amount funded through a portion of each wager placed to initiate a play of a primary game. When one or more triggering events occurs, the system provides at least a portion of the progressive award. After the system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846, 2009/0123364, 2009/0123363, and 2010/0227677 describe various examples of different progressive systems.

As generally noted above, in addition to providing winning credits or other awards for one or more plays of the primary game(s), in various embodiments the system provides credits or other awards for one or more plays of one or more secondary games. The secondary game typically enables a prize or payout in to be obtained addition to any prize or payout obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). It should be appreciated that the secondary game(s) may be any type of suitable game, either similar to or completely different from the primary game.

In various embodiments, the system automatically provides or initiates the secondary game upon the occurrence of a triggering event or the satisfaction of a qualifying condition. In other embodiments, the system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 2008/0070680, 2008/0176650, and 2009/0124363 describe various examples of different group systems.

In various embodiments, the system includes one or more player tracking systems. Such player tracking systems enable operators of the system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the system to begin a gaming session, the card reader reads the player identification number off the player tracking card to identify the player. The system timely tracks any suitable information or data relating to the identified player's gaming session. The system also timely tracks when the player tracking card is removed to conclude play for that gaming session. In another embodiment, rather than requiring insertion of a player tracking card into the card reader, the system utilizes one or more portable devices, such as a cell phone, a radio frequency identification tag, or any other suitable wireless device, to track when a gaming session begins and ends. In another embodiment, the system utilizes any suitable biometric technology or ticket technology to track when a gaming session begins and ends.

In such embodiments, during one or more gaming sessions, the system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

It should be understood that various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
   at least one processor;
   at least one display device; and
   at least one memory device that stores a plurality of instructions which, when executed by the at least one processor, cause the at least one processor to operate with the at least one display device to:
   (a) during a first time period, for a first piece of a code including a plurality of pieces:
      (i) hash the first piece of the code and a default seed to obtain a first result hash;
      (ii) determine whether the first result hash matches a first authentication checkpoint hash;
      (iii) if the first result hash matches the first authentication checkpoint hash, authorize the first piece of the code for execution; and
      (iv) if the first result hash does not match the first authentication checkpoint hash, not authorize the first piece of the code for execution;
   (b) during a second time period that is initiated before completion of the first time period and that at least partially overlaps the first time period, for a second different piece of the code:
      (i) hash the second piece of the code and the first authentication checkpoint hash to obtain a second result hash;
      (ii) determine whether the second result hash matches a second authentication checkpoint hash;
      (iii) if the second result hash matches the second authentication checkpoint hash, authorize the second piece of the code for execution; and
      (iv) if the second result has does not match the second authentication checkpoint hash, not authorize the second piece of the code for execution; and
   (c) if each piece of the code is authorized for execution, execute the code and display an image generated by the executed code.

2. The system of claim 1, wherein the first time period and the second time period completely overlap.

3. The system of claim 1, which includes a plurality of processors including a first processor and a second different processor, and wherein the first processor performs (a) and the second processor performs (b).

4. The system of claim 1, wherein the second time period expires before the first time period expires.

5. The system of claim 1, wherein the plurality of instructions, when executed by the at least one processor, cause the at least one processor to:
   (1) if the first result hash does not match the first authentication checkpoint hash, generate a first error message identifying the first piece of the code; and
   (2) if the second result hash does not match the second authentication checkpoint hash, generate a second error message identifying the second piece of the code.

6. A system comprising:
   at least one processor;
   at least one display device; and
   at least one memory device that stores a plurality of instructions which, when executed by the at least one processor, cause the at least one processor to operate with the at least one display device to:
   (a) during a first time period, for a designated one of a plurality of pieces of a code, said designated piece of the code preceding each remaining piece of the code in a designated order:
      (i) hash said designated piece of the code and a default seed to obtain a first result hash;
      (ii) determine whether the first result hash matches an authentication checkpoint hash associated with said designated piece of the code, said authentication checkpoint hash being one of a plurality of different authentication checkpoint hashes, each of the authentication checkpoint hashes being associated with a different piece of the code;
      (iii) if the first result hash matches said authentication checkpoint hash associated with said designated piece of the code, authorize said designated piece of the code for execution; and
      (iv) if the first result hash does not match said authentication checkpoint hash associated with said designated piece of the code, not authorize said designated piece of the code for execution;
   (b) during a second time period that is initiated before completion of the first time period and that at least partially overlaps the first time period, for each remaining piece of the code:
      (i) hash said piece of the code and the authentication checkpoint hash associated with the piece of the code immediately preceding said piece of the code in the designated order to obtain a result hash;
      (ii) determine whether the result hash matches the authentication checkpoint hash associated with said piece of the code;
      (iii) if the result hash matches the authentication checkpoint hash associated with said piece of the code, authorize said piece of the code for execution; and
      (iv) if the result hash does not match the authentication checkpoint hash associated with said piece of the code, not authorize said piece of the code for execution; and
   (c) if each of the pieces of the code are authorized for execution, execute the code and display an image generated by the executed code.

7. The system of claim 6, wherein the second time period completely overlaps the first time period.

8. The system of claim 6, which includes a plurality of processors including a first processor and a different second processor, and wherein the first processor performs (a) and the second processor performs (b) for at least one remaining piece of the code.

9. The system of claim 6, wherein the plurality of instructions, when executed by the at least one processor, cause the at least one processor to:
(1) if the first result hash does not match the authentication checkpoint hash associated with said designated piece of the code, generate a first error message identifying the designated piece of the code; and
(2) for each remaining piece of the code, if the result hash does not match the authentication checkpoint hash associated with said piece of the code, generate a second error message identifying said piece of the code.

10. The system of claim 6, wherein the plurality of instructions, when executed by the at least one processor, cause the at least one processor to initiate the first time period and the second time period at a same point in time.

11. A method comprising:
(a) during a first time period, for a first piece of a code including a plurality of pieces:
(i) causing at least one processor to execute a plurality of instructions to hash the first piece of the code and a default seed to obtain a first result hash;
(ii) causing the at least one processor to execute the plurality of instructions to determine whether the first result hash matches a first authentication checkpoint hash;
(iii) if the first result hash matches the first authentication checkpoint hash, causing the at least one processor to execute the plurality of instructions to authorize the first piece of the code for execution; and
(iv) if the first result hash does not match the first authentication checkpoint hash, causing the at least one processor to execute the plurality of instructions to not authorize the first piece of the code for execution;
(b) during a second time period that is initiated before completion of the first time period and that at least partially overlaps the first time period, for a second different piece of the code:
(i) causing the at least one processor to execute the plurality of instructions to hash the second piece of the code and the first authentication checkpoint hash to obtain a second result hash;
(ii) causing the at least one processor to execute the plurality of instructions to determine whether the second result hash matches a second authentication checkpoint hash;
(iii) if the second result hash matches the second authentication checkpoint hash, causing the at least one processor to execute the plurality of instructions to authorize the second piece of the code for execution; and
(iv) if the second result has does not match the second authentication checkpoint hash, causing the at least one processor to execute the plurality of instructions to not authorize the second piece of the code for execution; and
(c) if each piece of the code is authorized for execution, causing the at least one processor to execute the plurality of instructions to execute the code and operate with at least one display device to display an image generated by the executed code.

12. The method of claim 11, wherein the first time period and the second time period completely overlap.

13. The method of claim 11, which includes causing a first processor to execute the plurality of instructions to perform (a) and causing a second different processor to execute the plurality of instructions to perform (b).

14. The method of claim 11, wherein the second time period expires before the first time period expires.

15. The method of claim 11, which includes causing the at least one processor to execute the plurality of instructions to:
(1) if the first result hash does not match the first authentication checkpoint hash, generate a first error message identifying the first piece of the code; and
(2) if the second result hash does not match the second authentication checkpoint hash, generate a second error message identifying the second piece of the code.

16. A method comprising:
(a) during a first time period, for a designated one of a plurality of pieces of a code, said designated piece of the code preceding each remaining piece of the code in a designated order:
(i) causing at least one processor to execute a plurality of instructions to hash said designated piece of the code and a default seed to obtain a first result hash;
(ii) causing the at least one processor to execute the plurality of instructions to determine whether the first result hash matches an authentication checkpoint hash associated with said designated piece of the code, said authentication checkpoint hash being one of a plurality of different authentication checkpoint hashes, each of the authentication checkpoint hashes being associated with a different piece of the code;
(iii) if the first result hash matches said authentication checkpoint hash associated with said designated piece of the code, causing the at least one processor to execute the plurality of instructions to authorize said designated piece of the code for execution; and
(iv) if the first result hash does not match said authentication checkpoint hash associated with said designated piece of the code, causing the at least one processor to execute the plurality of instructions to not authorize said designated piece of the code for execution;
(b) during a second time period that is initiated before completion of the first time period and that at least partially overlaps the first time period, for each remaining piece of the code:
(i) causing the at least one processor to execute the plurality of instructions to hash said piece of the code and the authentication checkpoint hash associated with the piece of the code immediately preceding said piece of the code in the designated order to obtain a result hash;
(ii) causing the at least one processor to execute the plurality of instructions to determine whether the result hash matches the authentication checkpoint hash associated with said piece of the code;
(iii) if the result hash matches the authentication checkpoint hash associated with said piece of the code, causing the at least one processor to execute the plurality of instructions to authorize said piece of the code for execution; and
(iv) if the result hash does not match the authentication checkpoint hash associated with said piece of the code, causing the at least one processor to execute the plurality of instructions to not authorize said piece of the code for execution; and
(c) if each of the pieces of the code are authorized for execution, execute the code and display an image generated by the executed code.

17. The method of claim 16, wherein the second time period completely overlaps the first time period.

18. The method of claim 16, which includes causing a first processor to execute the plurality of instructions to perform (a) and causing a second different processor to execute the plurality of instructions to perform (b).

19. The method of claim 16, which includes causing the at least one processor to execute the plurality of instructions to:
   (1) if the first result hash does not match the authentication checkpoint hash associated with said designated piece of the code, generate a first error message identifying the designated piece of the code; and
   (2) for each remaining piece of the code, if the result hash does not match the authentication checkpoint hash associated with said piece of the code, generate a second error message identifying said piece of the code.

20. The method of claim 16, which includes causing the at least one processor to execute the plurality of instructions to initiate the first time period and the second time period at a same point in time.

\* \* \* \* \*